(12) United States Patent
Plattner et al.

(10) Patent No.: US 12,050,169 B2
(45) Date of Patent: Jul. 30, 2024

(54) PARTICLE COUNTING APPARATUS, SYSTEMS AND METHODS

(71) Applicant: Precision Planting LLC, Tremont, IL (US)

(72) Inventors: Chad E. Plattner, Tremont, IL (US); Philip Steiner, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 293 days.

(21) Appl. No.: 17/430,191

(22) PCT Filed: Mar. 20, 2020

(86) PCT No.: PCT/IB2020/052582
§ 371 (c)(1),
(2) Date: Aug. 11, 2021

(87) PCT Pub. No.: WO2020/194150
PCT Pub. Date: Oct. 1, 2020

(65) Prior Publication Data
US 2022/0155214 A1    May 19, 2022

Related U.S. Application Data

(60) Provisional application No. 62/822,655, filed on Mar. 22, 2019.

(51) Int. Cl.
*G01N 15/14*    (2024.01)
*A01C 7/10*    (2006.01)
(Continued)

(52) U.S. Cl.
CPC ......... *G01N 15/1459* (2013.01); *A01C 7/105* (2013.01); *G01N 15/1434* (2013.01);
(Continued)

(58) Field of Classification Search
CPC ............... A01C 7/105; G01N 15/1434; G01N 15/1459; G01N 2015/0003;
(Continued)

(56) References Cited

U.S. PATENT DOCUMENTS 4,490,801 A    12/1984   Hagan et al.
4,675,520 A    6/1987    Harrsen et al.
(Continued)

FOREIGN PATENT DOCUMENTS

EP    0175530 B1    3/1986
EP    1566089 B1    6/2007
(Continued)

OTHER PUBLICATIONS

Changhe, Chen et al, "Photo-optical sensor system for rapid evaluation of planter seed spacing uniformity", Proceedings of SPIE, vol. 2345, Jan. 6, 1995, pp. 306-313, XP055414424, US DOI: 10.1117/12.198885 ISBN: 978-1-5106-1533-5 section"3. Sensor Electronics".
(Continued)

*Primary Examiner* — Sunghee Y Gray

(57) ABSTRACT

In one embodiment a first light plane is generated across the passageway by a first LED emitter array. A corresponding photodiode receiver array detects particles passing through a first number of light channels comprising the first light plane. In a second embodiment a second light plane is generated across the passageway at 90 degrees from the first light plane and longitudinally offset from the first light plane by a second LED emitter array. A corresponding photodiode receiver array detects particles passing through a second number of light channels comprising the second light plane. The second light plane is capable of identifying particles in a third dimension that may go undetected when passing through the first light plane. The raw output signals gener-
(Continued)

ated by respective photodiodes is normalized, analyzed and characterized to differentiate between particles passing through light planes as individual particles or groups of overlapping particles to be separately counted.

20 Claims, 21 Drawing Sheets

(51) Int. Cl.
    *G01N 15/00*     (2024.01)
    *G01N 15/10*     (2024.01)
    *G01N 15/1434*     (2024.01)

(52) U.S. Cl.
    CPC ............... *G01N 2015/0046* (2013.01); *G01N 2015/1027* (2024.01); *G01N 2015/1486* (2013.01); *G01N 2015/1493* (2013.01)

(58) Field of Classification Search
    CPC ... G01N 2015/0046; G01N 2015/1075; G01N 2015/1486; G01N 2015/1493; G01N 2021/8592; G01N 21/85; Y02E 60/50
    USPC .......................................................... 356/338
    See application file for complete search history.

(56) References Cited

U.S. PATENT DOCUMENTS

| | | | |
|---|---|---|---|
| 5,650,609 | A | 7/1997 | Mertins et al. |
| 6,093,926 | A | 7/2000 | Mertins et al. |
| 8,473,168 | B2 | 6/2013 | Goldman et al. |
| 8,618,465 | B2 | 12/2013 | Tevs et al. |
| 9,179,595 | B2 | 11/2015 | Kormann et al. |
| 9,867,328 | B2 | 1/2018 | Tevs et al. |
| 9,888,623 | B2 | 2/2018 | Tevs et al. |
| 2010/0116974 | A1 | 5/2010 | Liu et al. |
| 2011/0303137 | A1 | 12/2011 | Tevs et al. |
| 2013/0075604 | A1* | 3/2013 | Bean ................ H01J 37/228 250/306 |
| 2016/0374263 | A1 | 12/2016 | Steffen et al. |
| 2018/0255698 | A1* | 9/2018 | Körösi ................ A01C 7/081 |

FOREIGN PATENT DOCUMENTS

| | | |
|---|---|---|
| EP | 2 561 744 A1 | 2/2013 |
| ES | 2543033 A1 | 8/2015 |
| WO | 2005/096798 A1 | 10/2005 |
| WO | 2005/096799 A1 | 10/2005 |
| WO | 2017/033034 A1 | 3/2017 |

OTHER PUBLICATIONS

European Patent Office, International Search Report for International Application No. PCT/IB2020/052582, mail date Jul. 7, 2020.
Lan, Kocher & Smith, "Opto-electronic Sensor System for Laboratory Measurement of Planter Seed Spacing with Small Seeds" (1999). Biological Systems Engineering: Papers and Publications. 162, found @ http://digitalcommons.unl.edu/biosysengfacpub/162.
Kocher, Lan, Chen, and Smith, "Opto-Electronic Sensor System for Rapid Evaluation of Planter Seed Spacing Uniformity" (1998). Biological Systems Engineering: Papers and Publications. 150. found @ https://digitalcommons.unl.edu/biosysengfacpub/150.
Smith & Kocher, "Evaluate Planter Meter and Seed Tube Systems for Seed Spacing Performance of Confection Sunflower Seed to Improve Plant Spacing in the Field" (unknown date). Biological Systems Engineering Dept., University of Nebraska—Lincoln, Panhandle Research and Extension Center, Scottsbluff, NE; and Lincoln, NE, found @ https://www.sunflowernsa.com/uploads/research/330/Smith_PlanterMeter_08.pdf.

\* cited by examiner

| SCAN | C1 | C2 | C3 | C4 | C5 | C6 | C7 | C8 | C9 | C10 | C11 | C12 |
|---|---|---|---|---|---|---|---|---|---|---|---|---|
| 50 | 0.3 | 0.4 | 0.5 | 0.5 | 0.4 | 0.4 | 0.4 | 0.4 | 0.5 | 0.4 | 0.5 | 0.4 |
| 49 | 0.3 | 0.4 | 0.5 | 0.5 | 0.4 | 0.4 | 0.4 | 0.4 | 0.4 | 0.4 | 0.5 | 0.4 |
| 48 | 0.3 | 0.4 | 0.5 | 0.3 | 0.4 | 0.4 | 0.4 | 0.4 | 0.3 | 0.4 | 0.5 | 0.4 |
| 47 | 0.3 | 0.4 | 0.5 | 0.3 | 0.4 | 0.4 | 0.2 | 0.1 | 0.2 | 0.4 | 0.5 | 0.4 |
| 46 | 0.3 | 0.4 | 0.5 | 0.3 | 0.2 | 0.4 | 0.0 | 0.0 | 0.1 | 0.4 | 0.5 | 0.4 |
| 45 | 0.3 | 0.4 | 0.5 | 0.3 | 0.1 | 0.4 | 0.0 | 0.0 | 0.0 | 0.4 | 0.5 | 0.4 |
| 44 | 0.3 | 0.4 | 0.5 | 0.3 | 0.0 | 0.2 | 0.0 | 0.0 | 0.0 | 0.2 | 0.5 | 0.4 |
| 43 | 0.3 | 0.4 | 0.5 | 0.3 | 0.0 | 0.1 | 0.2 | 0.0 | 0.0 | 0.1 | 0.5 | 0.4 |
| 42 | 0.3 | 0.4 | 0.5 | 0.3 | 0.0 | 0.0 | 0.3 | 0.0 | 0.0 | 0.0 | 0.5 | 0.4 |
| 41 | 0.3 | 0.4 | 0.5 | 0.3 | 0.0 | 0.0 | 0.3 | 0.0 | 0.0 | 0.0 | 0.5 | 0.4 |
| 40 | 0.3 | 0.4 | 0.5 | 0.5 | 0.0 | 0.0 | 0.4 | 0.4 | 0.0 | 0.0 | 0.5 | 0.4 |
| 39 | 0.3 | 0.4 | 0.5 | 0.5 | 0.0 | 0.0 | 0.4 | 0.4 | 0.0 | 0.1 | 0.5 | 0.4 |
| 38 | 0.3 | 0.4 | 0.5 | 0.5 | 0.4 | 0.4 | 0.4 | 0.4 | 0.1 | 0.2 | 0.5 | 0.4 |
| 37 | 0.3 | 0.4 | 0.5 | 0.5 | 0.4 | 0.4 | 0.4 | 0.0 | 0.1 | 0.2 | 0.5 | 0.4 |
| 36 | 0.3 | 0.4 | 0.5 | 0.5 | 0.4 | 0.4 | 0.3 | 0.0 | 0.1 | 0.2 | 0.5 | 0.4 |
| 35 | 0.3 | 0.4 | 0.5 | 0.5 | 0.4 | 0.2 | 0.3 | 0.0 | 0.2 | 0.2 | 0.5 | 0.4 |
| 34 | 0.3 | 0.4 | 0.5 | 0.5 | 0.1 | 0.1 | 0.2 | 0.0 | 0.3 | 0.2 | 0.5 | 0.4 |
| 33 | 0.3 | 0.4 | 0.5 | 0.4 | 0.0 | 0.0 | 0.2 | 0.0 | 0.2 | 0.2 | 0.5 | 0.4 |
| 32 | 0.3 | 0.4 | 0.5 | 0.4 | 0.0 | 0.0 | 0.1 | 0.0 | 0.1 | 0.2 | 0.5 | 0.4 |
| 31 | 0.3 | 0.4 | 0.5 | 0.5 | 0.0 | 0.0 | 0.1 | 0.0 | 0.1 | 0.2 | 0.5 | 0.4 |
| 30 | 0.3 | 0.4 | 0.5 | 0.5 | 0.0 | 0.0 | 0.0 | 0.0 | 0.1 | 0.3 | 0.5 | 0.4 |
| 29 | 0.3 | 0.4 | 0.5 | 0.5 | 0.0 | 0.0 | 0.1 | 0.4 | 0.0 | 0.4 | 0.5 | 0.4 |
| 28 | 0.3 | 0.4 | 0.5 | 0.5 | 0.2 | 0.0 | 0.2 | 0.3 | 0.0 | 0.4 | 0.5 | 0.4 |
| 27 | 0.3 | 0.4 | 0.5 | 0.5 | 0.3 | 0.1 | 0.3 | 0.3 | 0.1 | 0.4 | 0.5 | 0.4 |
| 26 | 0.3 | 0.4 | 0.5 | 0.5 | 0.3 | 0.1 | 0.3 | 0.3 | 0.1 | 0.0 | 0.5 | 0.4 |
| 25 | 0.3 | 0.4 | 0.5 | 0.5 | 0.4 | 0.3 | 0.4 | 0.4 | 0.0 | 0.1 | 0.5 | 0.4 |
| 24 | 0.3 | 0.4 | 0.5 | 0.5 | 0.3 | 0.4 | 0.4 | 0.4 | 0.0 | 0.2 | 0.5 | 0.4 |
| 23 | 0.3 | 0.4 | 0.5 | 0.5 | 0.4 | 0.5 | 0.4 | 0.4 | 0.0 | 0.3 | 0.5 | 0.4 |
| 22 | 0.3 | 0.4 | 0.5 | 0.5 | 0.4 | 0.5 | 0.4 | 0.2 | 0.1 | 0.3 | 0.5 | 0.4 |
| 21 | 0.3 | 0.4 | 0.5 | 0.5 | 0.4 | 0.5 | 0.4 | 0.2 | 0.1 | 0.2 | 0.5 | 0.4 |
| 20 | 0.3 | 0.4 | 0.5 | 0.5 | 0.4 | 0.5 | 0.4 | 0.2 | 0.1 | 0.2 | 0.5 | 0.4 |
| 19 | 0.3 | 0.4 | 0.5 | 0.5 | 0.4 | 0.5 | 0.4 | 0.2 | 0.3 | 0.2 | 0.5 | 0.4 |
| 18 | 0.3 | 0.4 | 0.5 | 0.5 | 0.4 | 0.5 | 0.4 | 0.2 | 0.3 | 0.2 | 0.5 | 0.4 |
| 17 | 0.3 | 0.4 | 0.1 | 0.4 | 0.4 | 0.5 | 0.4 | 0.2 | 0.2 | 0.4 | 0.5 | 0.4 |
| 16 | 0.3 | 0.4 | 0.0 | 0.3 | 0.4 | 0.5 | 0.4 | 0.2 | 0.2 | 0.4 | 0.5 | 0.4 |
| 15 | 0.3 | 0.5 | 0.0 | 0.1 | 0.4 | 0.5 | 0.4 | 0.2 | 0.2 | 0.4 | 0.5 | 0.4 |
| 14 | 0.3 | 0.5 | 0.0 | 0.1 | 0.4 | 0.5 | 0.4 | 0.4 | 0.4 | 0.4 | 0.5 | 0.4 |
| 13 | 0.3 | 0.3 | 0.0 | 0.1 | 0.4 | 0.5 | 0.4 | 0.4 | 0.4 | 0.4 | 0.5 | 0.4 |
| 12 | 0.3 | 0.2 | 0.0 | 0.1 | 0.4 | 0.5 | 0.4 | 0.4 | 0.4 | 0.4 | 0.5 | 0.4 |
| 11 | 0.3 | 0.2 | 0.0 | 0.1 | 0.4 | 0.5 | 0.4 | 0.4 | 0.4 | 0.4 | 0.5 | 0.4 |
| 10 | 0.3 | 0.1 | 0.0 | 0.3 | 0.4 | 0.5 | 0.4 | 0.4 | 0.4 | 0.4 | 0.5 | 0.4 |
| 9 | 0.3 | 0.1 | 0.0 | 0.3 | 0.4 | 0.5 | 0.4 | 0.4 | 0.4 | 0.4 | 0.5 | 0.4 |
| 8 | 0.3 | 0.2 | 0.1 | 0.4 | 0.4 | 0.4 | 0.4 | 0.4 | 0.4 | 0.4 | 0.5 | 0.4 |
| 7 | 0.3 | 0.2 | 0.1 | 0.4 | 0.4 | 0.4 | 0.4 | 0.4 | 0.4 | 0.4 | 0.5 | 0.4 |
| 6 | 0.3 | 0.2 | 0.1 | 0.5 | 0.4 | 0.4 | 0.4 | 0.4 | 0.4 | 0.4 | 0.5 | 0.4 |
| 5 | 0.3 | 0.1 | 0.3 | 0.5 | 0.4 | 0.4 | 0.4 | 0.4 | 0.4 | 0.4 | 0.5 | 0.4 |
| 4 | 0.3 | 0.2 | 0.5 | 0.5 | 0.4 | 0.4 | 0.4 | 0.4 | 0.4 | 0.4 | 0.5 | 0.4 |
| 3 | 0.3 | 0.3 | 0.5 | 0.5 | 0.4 | 0.4 | 0.4 | 0.4 | 0.5 | 0.4 | 0.5 | 0.4 |
| 2 | 0.3 | 0.4 | 0.5 | 0.5 | 0.4 | 0.4 | 0.4 | 0.4 | 0.5 | 0.4 | 0.5 | 0.4 |
| 1 | 0.3 | 0.4 | 0.5 | 0.5 | 0.4 | 0.4 | 0.4 | 0.4 | 0.5 | 0.4 | 0.5 | 0.4 |

Raw Voltage Signal (Vraw)

FIG. 3A

| SCAN | C1 | C2 | C3 | C4 | C5 | C6 | C7 | C8 | C9 | C10 | C11 | C12 |
|---|---|---|---|---|---|---|---|---|---|---|---|---|
| \multicolumn{13}{c}{Normalized Output Signal (NOS)} |
| 50 | 0.0 | 0.0 | 0.0 | 0.0 | 0.0 | 0.0 | 0.0 | 0.0 | 0.0 | 0.0 | 0.0 | 0.0 |
| 49 | 0.0 | 0.0 | 0.0 | 0.0 | 0.0 | 0.0 | 0.0 | 0.1 | 0.1 | 0.0 | 0.0 | 0.0 |
| 48 | 0.0 | 0.0 | 0.0 | 0.2 | 0.0 | 0.0 | 0.0 | 0.6 | 0.2 | 0.0 | 0.0 | 0.0 |
| 47 | 0.0 | 0.0 | 0.0 | 0.2 | 0.0 | 0.0 | 0.8 | 0.9 | 0.3 | 0.0 | 0.0 | 0.0 |
| 46 | 0.0 | 0.0 | 0.0 | 0.2 | 0.6 | 0.0 | 1.0 | 1.0 | 0.8 | 0.1 | 0.0 | 0.0 |
| 45 | 0.0 | 0.0 | 0.0 | 0.2 | 0.9 | 0.0 | 1.0 | 1.0 | 1.0 | 0.3 | 0.0 | 0.0 |
| 44 | 0.0 | 0.0 | 0.0 | 0.2 | 1.0 | 0.6 | 0.9 | 1.0 | 1.0 | 0.8 | 0.0 | 0.0 |
| 43 | 0.0 | 0.0 | 0.0 | 0.2 | 1.0 | 0.9 | 0.5 | 1.0 | 1.0 | 1.0 | 0.0 | 0.0 |
| 42 | 0.0 | 0.0 | 0.0 | 0.2 | 1.0 | 1.0 | 0.2 | 1.0 | 0.9 | 1.0 | 0.0 | 0.0 |
| 41 | 0.0 | 0.0 | 0.0 | 0.2 | 1.0 | 1.0 | 0.2 | 1.0 | 0.8 | 1.0 | 0.0 | 0.0 |
| 40 | 0.0 | 0.0 | 0.0 | 0.0 | 1.0 | 1.0 | 0.0 | 0.0 | 0.9 | 0.9 | 0.0 | 0.0 |
| 39 | 0.0 | 0.0 | 0.0 | 0.0 | 1.0 | 1.0 | 0.0 | 0.0 | 0.8 | 0.8 | 0.0 | 0.0 |
| 38 | 0.0 | 0.0 | 0.0 | 0.0 | 0.0 | 0.0 | 0.0 | 0.0 | 0.6 | 0.9 | 0.0 | 0.0 |
| 37 | 0.0 | 0.0 | 0.0 | 0.0 | 0.0 | 0.0 | 0.0 | 1.0 | 0.9 | 0.8 | 0.0 | 0.0 |
| 36 | 0.0 | 0.0 | 0.0 | 0.0 | 0.0 | 0.0 | 0.1 | 1.0 | 1.0 | 0.6 | 0.0 | 0.0 |
| 35 | 0.0 | 0.0 | 0.0 | 0.0 | 0.0 | 0.2 | 0.1 | 1.0 | 1.0 | 0.3 | 0.0 | 0.0 |
| 34 | 0.0 | 0.0 | 0.0 | 0.0 | 0.2 | 0.8 | 0.4 | 1.0 | 0.9 | 0.2 | 0.0 | 0.0 |
| 33 | 0.0 | 0.0 | 0.0 | 0.0 | 0.8 | 1.0 | 0.7 | 1.0 | 0.8 | 0.7 | 0.0 | 0.0 |
| 32 | 0.0 | 0.0 | 0.0 | 0.0 | 1.0 | 1.0 | 0.8 | 1.0 | 0.8 | 0.9 | 0.0 | 0.0 |
| 31 | 0.0 | 0.0 | 0.0 | 0.0 | 1.0 | 1.0 | 0.9 | 1.0 | 0.8 | 1.0 | 0.0 | 0.0 |
| 30 | 0.0 | 0.0 | 0.0 | 0.0 | 1.0 | 1.0 | 1.0 | 1.0 | 1.0 | 0.0 | 0.0 | 0.0 |
| 29 | 0.0 | 0.0 | 0.0 | 0.0 | 1.0 | 1.0 | 0.9 | 1.0 | 1.0 | 0.0 | 0.0 | 0.0 |
| 28 | 0.0 | 0.0 | 0.0 | 0.0 | 0.9 | 1.0 | 0.5 | 0.6 | 1.0 | 0.0 | 0.0 | 0.0 |
| 27 | 0.0 | 0.0 | 0.0 | 0.0 | 0.6 | 0.9 | 0.2 | 0.2 | 1.0 | 0.0 | 0.0 | 0.0 |
| 26 | 0.0 | 0.0 | 0.0 | 0.0 | 0.2 | 0.8 | 0.2 | 0.2 | 1.0 | 0.9 | 0.0 | 0.0 |
| 25 | 0.0 | 0.0 | 0.0 | 0.0 | 0.0 | 0.4 | 0.1 | 0.1 | 1.0 | 0.9 | 0.0 | 0.0 |
| 24 | 0.0 | 0.0 | 0.0 | 0.0 | 0.0 | 0.0 | 0.0 | 0.0 | 1.0 | 0.8 | 0.0 | 0.0 |
| 23 | 0.0 | 0.0 | 0.0 | 0.0 | 0.0 | 0.0 | 0.0 | 0.0 | 1.0 | 0.6 | 0.0 | 0.0 |
| 22 | 0.0 | 0.0 | 0.0 | 0.0 | 0.0 | 0.0 | 0.0 | 0.2 | 0.9 | 0.5 | 0.0 | 0.0 |
| 21 | 0.0 | 0.0 | 0.0 | 0.0 | 0.0 | 0.0 | 0.0 | 0.2 | 0.9 | 0.2 | 0.0 | 0.0 |
| 20 | 0.0 | 0.0 | 0.0 | 0.0 | 0.0 | 0.0 | 0.0 | 0.2 | 0.8 | 0.2 | 0.0 | 0.0 |
| 19 | 0.0 | 0.0 | 0.0 | 0.0 | 0.0 | 0.0 | 0.0 | 0.2 | 0.8 | 0.2 | 0.0 | 0.0 |
| 18 | 0.0 | 0.0 | 0.0 | 0.0 | 0.0 | 0.0 | 0.0 | 0.2 | 0.6 | 0.2 | 0.0 | 0.0 |
| 17 | 0.0 | 0.0 | 0.7 | 0.2 | 0.0 | 0.0 | 0.0 | 0.2 | 0.2 | 0.1 | 0.0 | 0.0 |
| 16 | 0.0 | 0.1 | 1.0 | 0.4 | 0.0 | 0.0 | 0.0 | 0.2 | 0.2 | 0.0 | 0.0 | 0.0 |
| 15 | 0.0 | 0.1 | 1.0 | 0.7 | 0.0 | 0.0 | 0.0 | 0.2 | 0.2 | 0.0 | 0.0 | 0.0 |
| 14 | 0.0 | 0.1 | 1.0 | 0.9 | 0.0 | 0.0 | 0.0 | 0.1 | 0.0 | 0.0 | 0.0 | 0.0 |
| 13 | 0.0 | 0.5 | 1.0 | 0.9 | 0.0 | 0.0 | 0.0 | 0.0 | 0.0 | 0.0 | 0.0 | 0.0 |
| 12 | 0.0 | 0.7 | 1.0 | 0.9 | 0.0 | 0.0 | 0.0 | 0.0 | 0.0 | 0.0 | 0.0 | 0.0 |
| 11 | 0.0 | 0.7 | 1.0 | 0.7 | 0.0 | 0.0 | 0.0 | 0.0 | 0.0 | 0.0 | 0.0 | 0.0 |
| 10 | 0.0 | 0.7 | 1.0 | 0.4 | 0.0 | 0.0 | 0.0 | 0.0 | 0.0 | 0.0 | 0.0 | 0.0 |
| 9 | 0.0 | 0.7 | 1.0 | 0.2 | 0.0 | 0.0 | 0.0 | 0.0 | 0.0 | 0.0 | 0.0 | 0.0 |
| 8 | 0.0 | 0.7 | 0.9 | 0.2 | 0.0 | 0.0 | 0.0 | 0.0 | 0.0 | 0.0 | 0.0 | 0.0 |
| 7 | 0.0 | 0.7 | 0.9 | 0.2 | 0.0 | 0.0 | 0.0 | 0.0 | 0.0 | 0.0 | 0.0 | 0.0 |
| 6 | 0.0 | 0.7 | 0.8 | 0.1 | 0.0 | 0.0 | 0.0 | 0.0 | 0.0 | 0.0 | 0.0 | 0.0 |
| 5 | 0.0 | 0.8 | 0.3 | 0.1 | 0.0 | 0.0 | 0.0 | 0.0 | 0.0 | 0.0 | 0.0 | 0.0 |
| 4 | 0.0 | 0.7 | 0.1 | 0.0 | 0.0 | 0.0 | 0.0 | 0.0 | 0.0 | 0.0 | 0.0 | 0.0 |
| 3 | 0.0 | 0.4 | 0.1 | 0.0 | 0.0 | 0.0 | 0.0 | 0.0 | 0.0 | 0.0 | 0.0 | 0.0 |
| 2 | 0.0 | 0.0 | 0.0 | 0.0 | 0.0 | 0.0 | 0.0 | 0.0 | 0.0 | 0.0 | 0.0 | 0.0 |
| 1 | 0.0 | 0.0 | 0.0 | 0.0 | 0.0 | 0.0 | 0.0 | 0.0 | 0.0 | 0.0 | 0.0 | 0.0 |

FIG. 3B

Original Master Event Labels

| SCAN | C1 | C2 | C3 | C4 | C5 | C6 | C7 | C8 | C9 | C10 | C11 | C12 |
|---|---|---|---|---|---|---|---|---|---|---|---|---|
| 50 | | | | | | | | | | | | |
| 49 | | | | | | | | | | | | |
| 48 | | | | 1000 | | | | 1000 | 1000 | | | |
| 47 | | | | 1000 | | | 1000 | 1000 | 1000 | | | |
| 46 | | | | 1000 | 1000 | | 1000 | 1000 | 1000 | | | |
| 45 | | | | 1000 | 1000 | | 1000 | 1000 | 1000 | 1000 | | |
| 44 | | | | 1000 | 1000 | 1000 | 1000 | 1000 | 1000 | 1000 | | |
| 43 | | | | 1000 | 1000 | 1000 | 1000 | 1000 | 1000 | 1000 | | |
| 42 | | | | 1000 | 1000 | 1000 | 1000 | 1000 | 1000 | 1000 | | |
| 41 | | | | 1000 | 1000 | 1000 | 1000 | 1000 | 1000 | 1000 | | |
| 40 | | | | | 1000 | 1000 | | | 1000 | 1000 | | |
| 39 | | | | | 1000 | 1000 | | | 1000 | 1000 | | |
| 38 | | | | | | | | | 1000 | 1000 | | |
| 37 | | | | | | | | 1000 | 1000 | 1000 | | |
| 36 | | | | | | | | 1000 | 1000 | 1000 | | |
| 35 | | | | | | 1000 | | 1000 | 1000 | 1000 | | |
| 34 | | | | | 1000 | 1000 | 1000 | 1000 | 1000 | 1000 | | |
| 33 | | | | | 1000 | 1000 | 1000 | 1000 | 1000 | 1000 | | |
| 32 | | | | | 1000 | 1000 | 1000 | 1000 | 1000 | 1000 | | |
| 31 | | | | | 1000 | 1000 | 1000 | 1000 | 1000 | 1000 | | |
| 30 | | | | | 1000 | 1000 | 1000 | 1000 | 1000 | | | |
| 29 | | | | | 1000 | 1000 | 1000 | 1000 | 1000 | | | |
| 28 | | | | | 1000 | 1000 | 1000 | 1000 | 1000 | | | |
| 27 | | | | | 1000 | 1000 | 1000 | 1000 | 1000 | | | |
| 26 | | | | | 1000 | 1000 | 1000 | 1000 | 1000 | 1000 | | |
| 25 | | | | | | 1000 | | | 1000 | 1000 | | |
| 24 | | | | | | | | | 1000 | 1000 | | |
| 23 | | | | | | | | | 1000 | 1000 | | |
| 22 | | | | | | | | 1000 | 1000 | 1000 | | |
| 21 | | | | | | | | 1000 | 1000 | 1000 | | |
| 20 | | | | | | | | 1000 | 1000 | 1000 | | |
| 19 | | | | | | | | 1000 | 1000 | 1000 | | |
| 18 | | | | | | | | 1000 | 1000 | 1000 | | |
| 17 | | | 999 | 999 | | | | 1000 | 1000 | | | |
| 16 | | | 999 | 999 | | | | 1000 | 1000 | | | |
| 15 | | | 999 | 999 | | | | 1000 | 1000 | | | |
| 14 | | | 999 | 999 | | | | | | | | |
| 13 | | 999 | 999 | 999 | | | | | | | | |
| 12 | | 999 | 999 | 999 | | | | | | | | |
| 11 | | 999 | 999 | 999 | | | | | | | | |
| 10 | | 999 | 999 | 999 | | | | | | | | |
| 9 | | 999 | 999 | 999 | | | | | | | | |
| 8 | | 999 | 999 | 999 | | | | | | | | |
| 7 | | 999 | 999 | 999 | | | | | | | | |
| 6 | | 999 | 999 | | | | | | | | | |
| 5 | | 999 | 999 | | | | | | | | | |
| 4 | | 999 | | | | | | | | | | |
| 3 | | 999 | | | | | | | | | | |
| 2 | | | | | | | | | | | | |
| 1 | | | | | | | | | | | | |

| SCAN | C1 | C2 | C3 | C4 | C5 | C6 | C7 | C8 | C9 | C10 | C11 | C12 |
|---|---|---|---|---|---|---|---|---|---|---|---|---|
| 50 | | | | | | | | | | | | |
| 49 | | | | | | | | | | | | |
| 48 | | | | 1001 | | | | 1000 | 1000 | | | |
| 47 | | | | 1001 | | | 1001 | 1000 | 1000 | | | |
| 46 | | | | 1001 | 1001 | | 1001 | 1000 | 1000 | | | |
| 45 | | | | 1001 | 1001 | | 1001 | 1000 | 1000 | 1000 | | |
| 44 | | | | 1001 | 1001 | 1001 | 1001 | 1000 | 1000 | 1000 | | |
| 43 | | | | 1001 | 1001 | 1001 | 1001 | 1000 | 1000 | 1000 | | |
| 42 | | | | 1001 | 1001 | 1001 | 1001 | 1000 | 1000 | 1000 | | |
| 41 | | | | 1001 | 1001 | 1001 | 1001 | 1000 | 1000 | 1000 | | |
| 40 | | | | 1001 | 1001 | | | | 1000 | 1000 | | |
| 39 | | | | 1001 | 1001 | | | | 1000 | 1000 | | |
| 38 | | | | | | | | | 1000 | 1000 | | |
| 37 | | | | | | | | 1000 | 1000 | 1000 | | |
| 36 | | | | | | | | 1000 | 1000 | 1000 | | |
| 35 | | | | | 1001 | | | 1000 | 1000 | 1000 | | |
| 34 | | | | 1001 | 1001 | 1001 | 1001 | 1000 | 1000 | 1000 | | |
| 33 | | | | 1001 | 1001 | 1001 | 1001 | 1000 | 1000 | 1000 | | |
| 32 | | | | 1001 | 1001 | 1001 | 1001 | 1000 | 1000 | 1000 | | |
| 31 | | | | 1001 | 1001 | 1001 | 1001 | 1000 | 1000 | 1000 | | |
| 30 | | | | 1001 | 1001 | 1001 | 1001 | 1000 | 1000 | | | |
| 29 | | | | 1001 | 1001 | 1001 | 1000 | 1000 | 1000 | | | |
| 28 | | | | 1001 | 1001 | 1001 | 1000 | 1000 | 1000 | | | |
| 27 | | | | 1001 | 1001 | 1001 | 1000 | 1000 | 1000 | | | |
| 26 | | | | 1001 | 1001 | 1001 | 1000 | 1000 | 1000 | 1000 | | |
| 25 | | | | | 1001 | | | | 1000 | 1000 | | |
| 24 | | | | | | | | | 1000 | 1000 | | |
| 23 | | | | | | | | | 1000 | 1000 | | |
| 22 | | | | | | | | 1000 | 1000 | 1000 | | |
| 21 | | | | | | | | 1000 | 1000 | 1000 | | |
| 20 | | | | | | | | 1000 | 1000 | 1000 | | |
| 19 | | | | | | | | 1000 | 1000 | 1000 | | |
| 18 | | | | | | | | 1000 | 1000 | 1000 | | |
| 17 | | | 999 | 999 | | | | 1000 | 1000 | | | |
| 16 | | | 999 | 999 | | | | 1000 | 1000 | | | |
| 15 | | | 999 | 999 | | | | 1000 | 1000 | | | |
| 14 | | | 999 | 999 | | | | | | | | |
| 13 | | 999 | 999 | 999 | | | | | | | | |
| 12 | | 999 | 999 | 999 | | | | | | | | |
| 11 | | 999 | 999 | 999 | | | | | | | | |
| 10 | | 999 | 999 | 999 | | | | | | | | |
| 9 | | 999 | 999 | 999 | | | | | | | | |
| 8 | | 999 | 999 | 999 | | | | | | | | |
| 7 | | 999 | 999 | 999 | | | | | | | | |
| 6 | | 999 | 999 | | | | | | | | | |
| 5 | | 999 | 999 | | | | | | | | | |
| 4 | | 999 | | | | | | | | | | |
| 3 | | 999 | | | | | | | | | | |
| 2 | | | | | | | | | | | | |
| 1 | | | | | | | | | | | | |

Event Labeling Thu First Cycle of Steps 606-624 of FIG. 6

FIG. 8A

| Event Labeling Thu Second Cycle of Steps 606-624 of FIG. 6 | | | | | | | | | | | | |
|---|---|---|---|---|---|---|---|---|---|---|---|---|
| SCAN | C1 | C2 | C3 | C4 | C5 | C6 | C7 | C8 | C9 | C10 | C11 | C12 |
| 50 | | | | | | | | | | | | |
| 49 | | | | | | | | | | | | |
| 48 | | | | 1001 | | | | | 1002 | 1002 | | |
| 47 | | | | 1001 | | | 1002 | 1002 | 1002 | | | |
| 46 | | | | 1001 | 1001 | | 1002 | 1002 | 1002 | | | |
| 45 | | | | 1001 | 1001 | | 1002 | 1002 | 1002 | 1002 | | |
| 44 | | | | 1001 | 1001 | 1001 | 1001 | 1002 | 1002 | 1002 | | |
| 43 | | | | 1001 | 1001 | 1001 | 1001 | 1002 | 1002 | 1002 | | |
| 42 | | | | 1001 | 1001 | 1001 | 1001 | 1002 | 1002 | 1002 | | |
| 41 | | | | 1001 | 1001 | 1001 | 1001 | 1002 | 1002 | 1002 | | |
| 40 | | | | 1001 | 1001 | | | | 1002 | 1002 | | |
| 39 | | | | 1001 | 1001 | | | | 1002 | 1002 | | |
| 38 | | | | | | | | | 1002 | 1002 | | |
| 37 | | | | | | | | 1000 | 1002 | 1002 | | |
| 36 | | | | | | | | 1000 | 1002 | 1002 | | |
| 35 | | | | | | 1001 | | 1000 | 1002 | 1002 | | |
| 34 | | | | | 1001 | 1001 | 1001 | 1000 | 1002 | 1002 | | |
| 33 | | | | | 1001 | 1001 | 1001 | 1000 | 1000 | 1002 | | |
| 32 | | | | | 1001 | 1001 | 1001 | 1000 | 1000 | 1002 | | |
| 31 | | | | | 1001 | 1001 | 1001 | 1000 | 1000 | 1002 | | |
| 30 | | | | | 1001 | 1001 | 1001 | 1000 | 1000 | | | |
| 29 | | | | | 1001 | 1001 | 1000 | 1000 | 1000 | | | |
| 28 | | | | | 1001 | 1001 | 1000 | 1000 | 1000 | | | |
| 27 | | | | | 1001 | 1001 | 1000 | 1000 | 1000 | | | |
| 26 | | | | | 1001 | 1001 | 1000 | 1000 | 1000 | 1000 | | |
| 25 | | | | | | 1001 | | | 1000 | 1000 | | |
| 24 | | | | | | | | | 1000 | 1000 | | |
| 23 | | | | | | | | | 1000 | 1000 | | |
| 22 | | | | | | | | 1000 | 1000 | 1000 | | |
| 21 | | | | | | | | 1000 | 1000 | 1000 | | |
| 20 | | | | | | | | 1000 | 1000 | 1000 | | |
| 19 | | | | | | | | 1000 | 1000 | 1000 | | |
| 18 | | | | | | | | 1000 | 1000 | 1000 | | |
| 17 | | | 999 | 999 | | | | 1000 | 1000 | | | |
| 16 | | | 999 | 999 | | | | 1000 | 1000 | | | |
| 15 | | | 999 | 999 | | | | 1000 | 1000 | | | |
| 14 | | | 999 | 999 | | | | | | | | |
| 13 | | 999 | 999 | 999 | | | | | | | | |
| 12 | | 999 | 999 | 999 | | | | | | | | |
| 11 | | 999 | 999 | 999 | | | | | | | | |
| 10 | | 999 | 999 | 999 | | | | | | | | |
| 9 | | 999 | 999 | 999 | | | | | | | | |
| 8 | | 999 | 999 | 999 | | | | | | | | |
| 7 | | 999 | 999 | 999 | | | | | | | | |
| 6 | | 999 | 999 | | | | | | | | | |
| 5 | | 999 | 999 | | | | | | | | | |
| 4 | | 999 | | | | | | | | | | |
| 3 | | 999 | | | | | | | | | | |
| 2 | | | | | | | | | | | | |
| 1 | | | | | | | | | | | | |

FIG. 8B

PARTICLE COUNTING APPARATUS, SYSTEMS AND METHODS

BACKGROUND

When operating air seeders, particularly when applying product at high application rates such as small seeds (e.g., canola, flax, millet, oats, wheat, rye, barley, etc.) the product generally flows through the distribution lines to each row unit in a substantially continuous product stream. Thus, it should be appreciated that in order to obtain an accurate seed count, a sensing system is needed that is able to detect and count multiple seeds passing through the distribution lines at one time while differentiating seed from debris that may be passing through the distribution lines with the seed.

BRIEF DESCRIPTION OF THE DRAWINGS

FIG. 3A is a representation of raw voltage signals of the seeds shown in FIG. 2A or 2B passing through the first light plane of the particle counter assembly.

FIG. 3B is a representation of a Normalized Output Signal Output (NOS) scan after the raw voltage signals of FIG. 3A are inverted and normalized.

FIG. 7 is a representation of the NOS scan of FIG. 3B showing the labeling of the Master Events.

FIG. 8A is a representation of the splitting of the Master Event and labeling of the split Events after identification of the first trough column.

FIG. 8B is a representation of the further splitting of the Master Event and further labeling of the split Events after identification of the second trough column.

DESCRIPTION

Figure 1A:
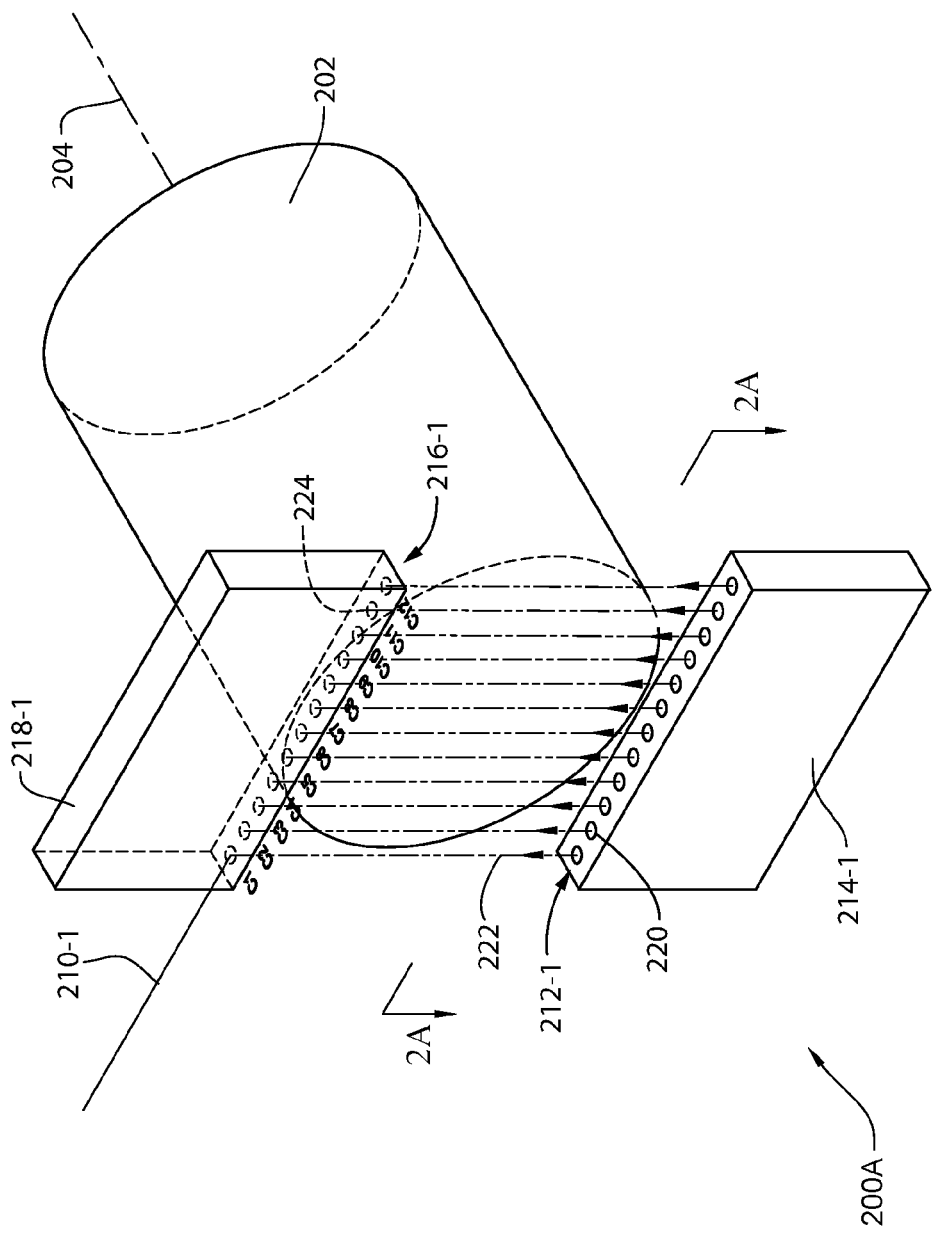
FIG. 1A is a perspective view of a single array embodiment of a particle counter assembly disposed along a passageway.
Figure 2A:
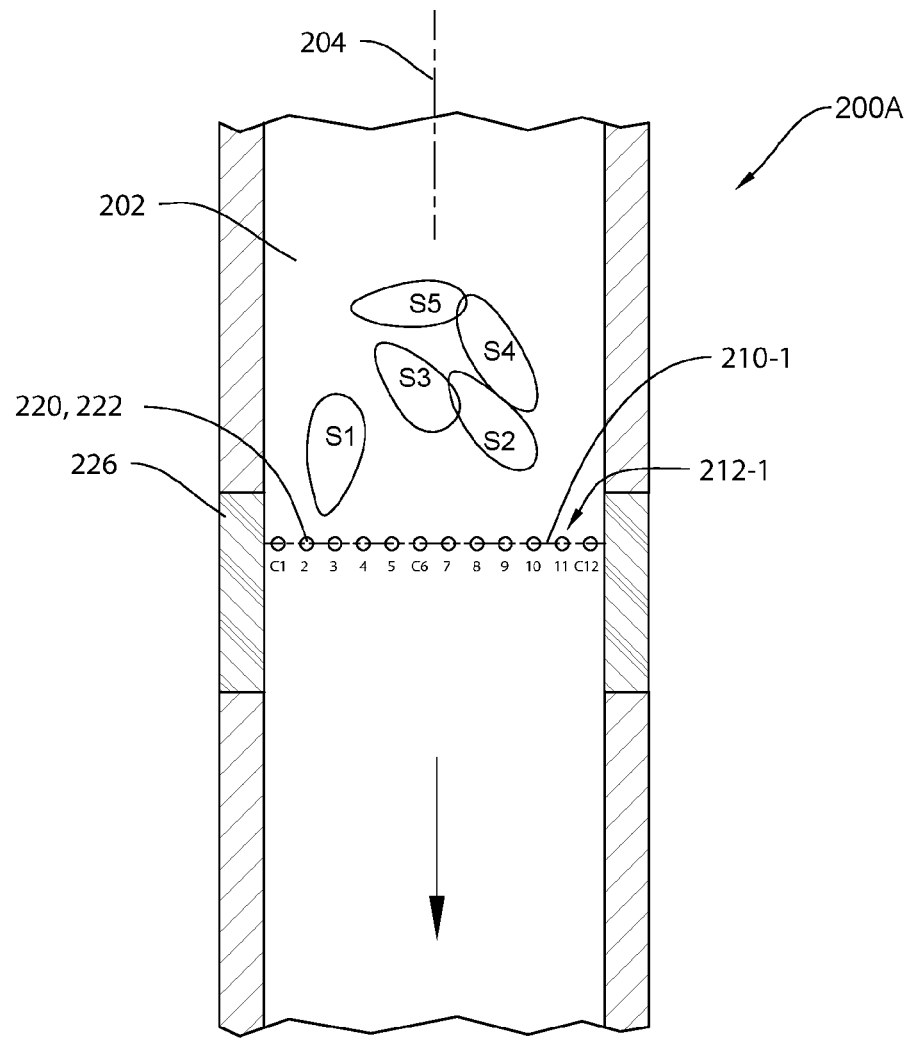
FIG. 2A is a cross-sectional view of the single array particle counter assembly as viewed along lines 2A-2A of FIG. 1A.

Referring to the drawings wherein like reference numerals designate the same or corresponding parts throughout the several views, FIG. 1A is an enlarged perspective view illustrating one embodiment of a single array particle counter assembly 200A shown disposed along a section of a tube or passageway 202 through which particles pass. FIG. 2A is a cross-sectional view through the particle counter 200A and passageway 202 as viewed along lines 2A-2A of FIG. 1A.

Figure 1B:
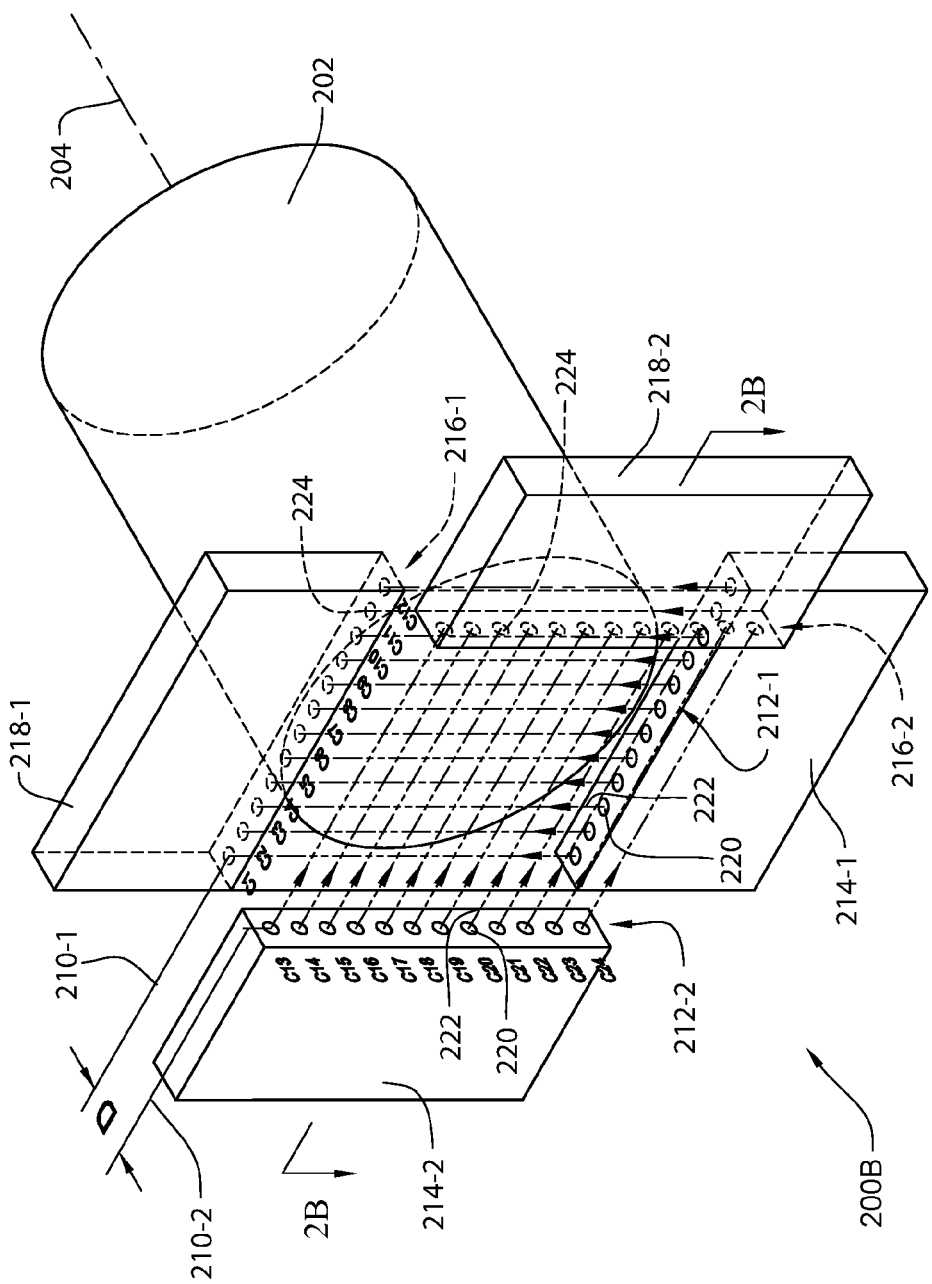
FIG. 1B is a perspective view of a double array embodiment of a particle counter assembly disposed along a passageway.
Figure 2B:
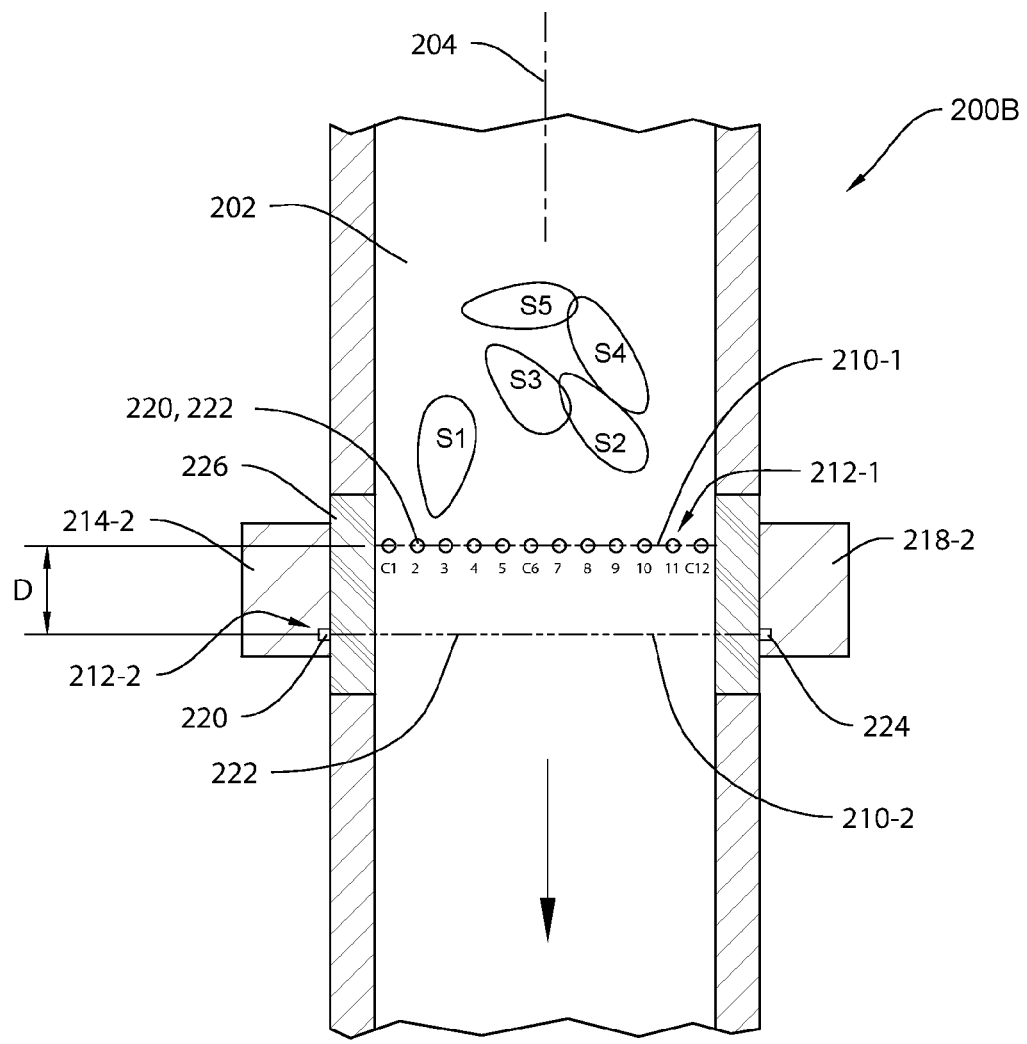
FIG. 2B is a cross-sectional view of the double array particle counter assembly as viewed along lines 2B-2B of FIG. 1B.

FIG. 1B is an enlarged perspective view illustrating one embodiment of a double array particle counter assembly 200B shown disposed along a section of a tube or passageway 202 through which particles pass. FIG. 2B is a cross-sectional view through the particle counter 200B and passageway 202 as viewed along lines 2B-2B of FIG. 1B.

Throughout this description, reference number 200 is used to generally refer to the particle counter assembly 200A or 200B unless a particular description pertains to only one of the embodiments, in which case reference number 200A will be used when discussing only the single array embodiment and reference number 200B will be used when discussing only the double array embodiment.

Figure 11:
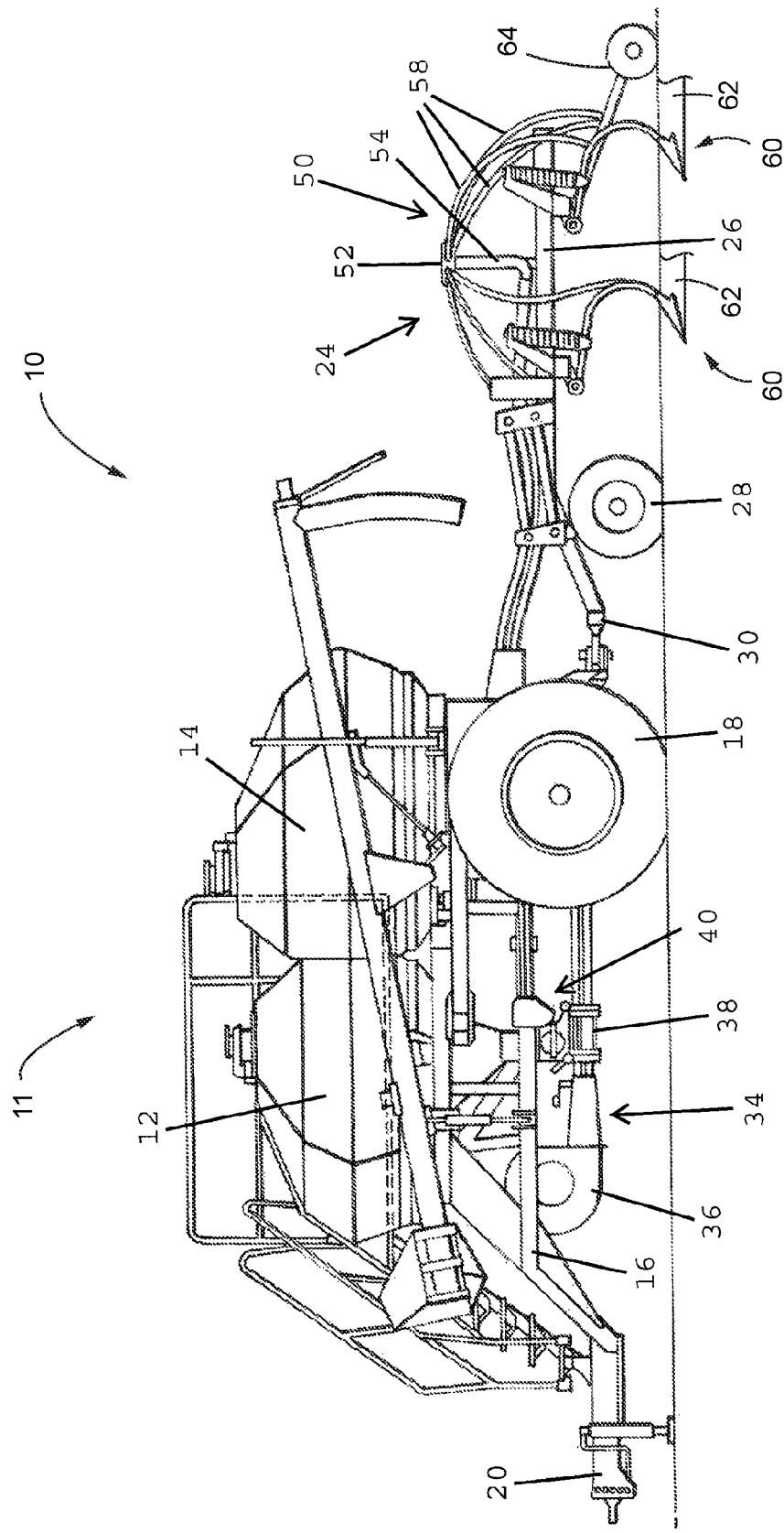
FIG. 11 is a side elevation view of an embodiment of a conventional air seeder.
Figure 12:
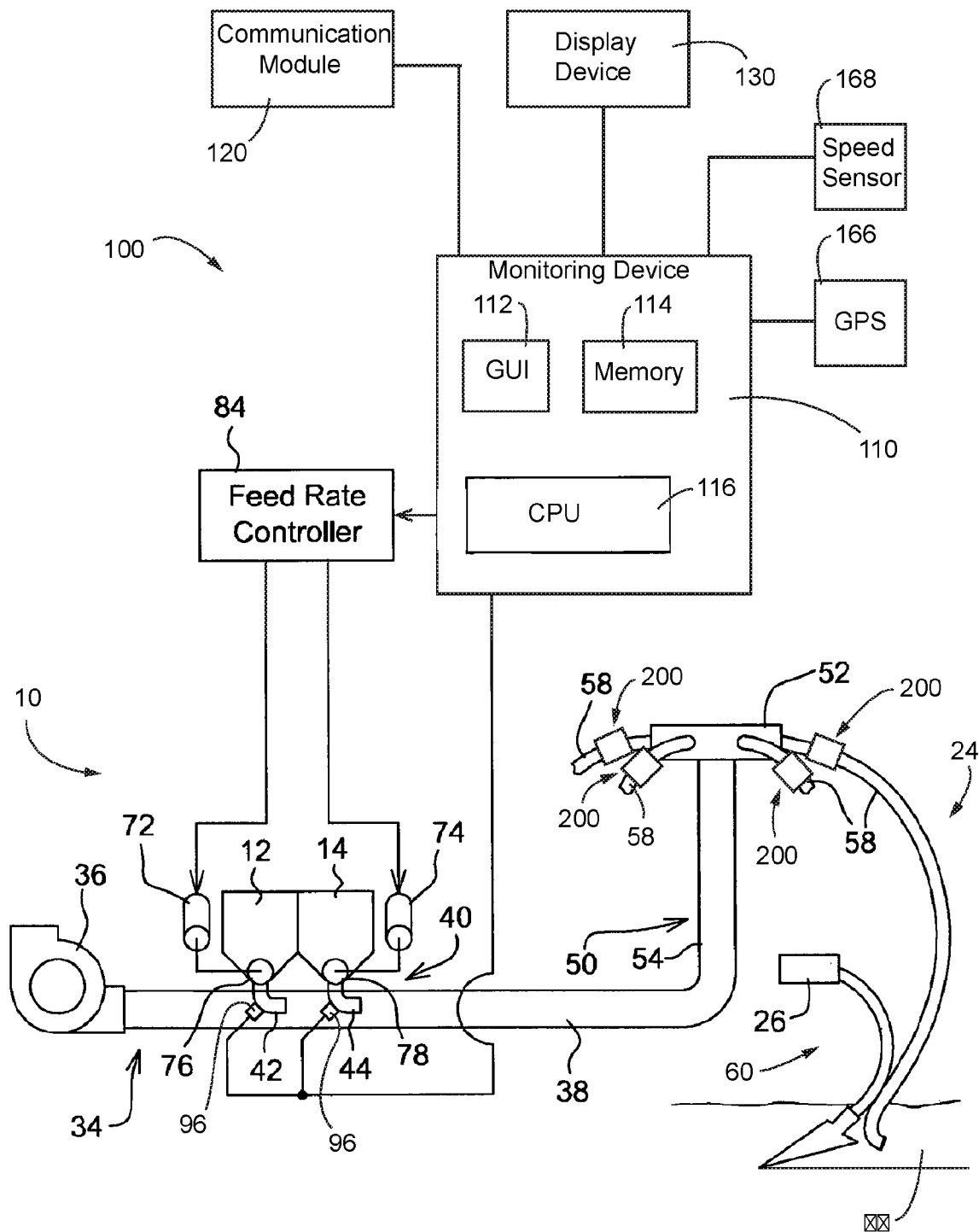
FIG. 12 is a schematic illustration of the air seeder of FIG. 11 with particle counter assemblies disposed along distribution lines of the air seeder.
Figure 13:
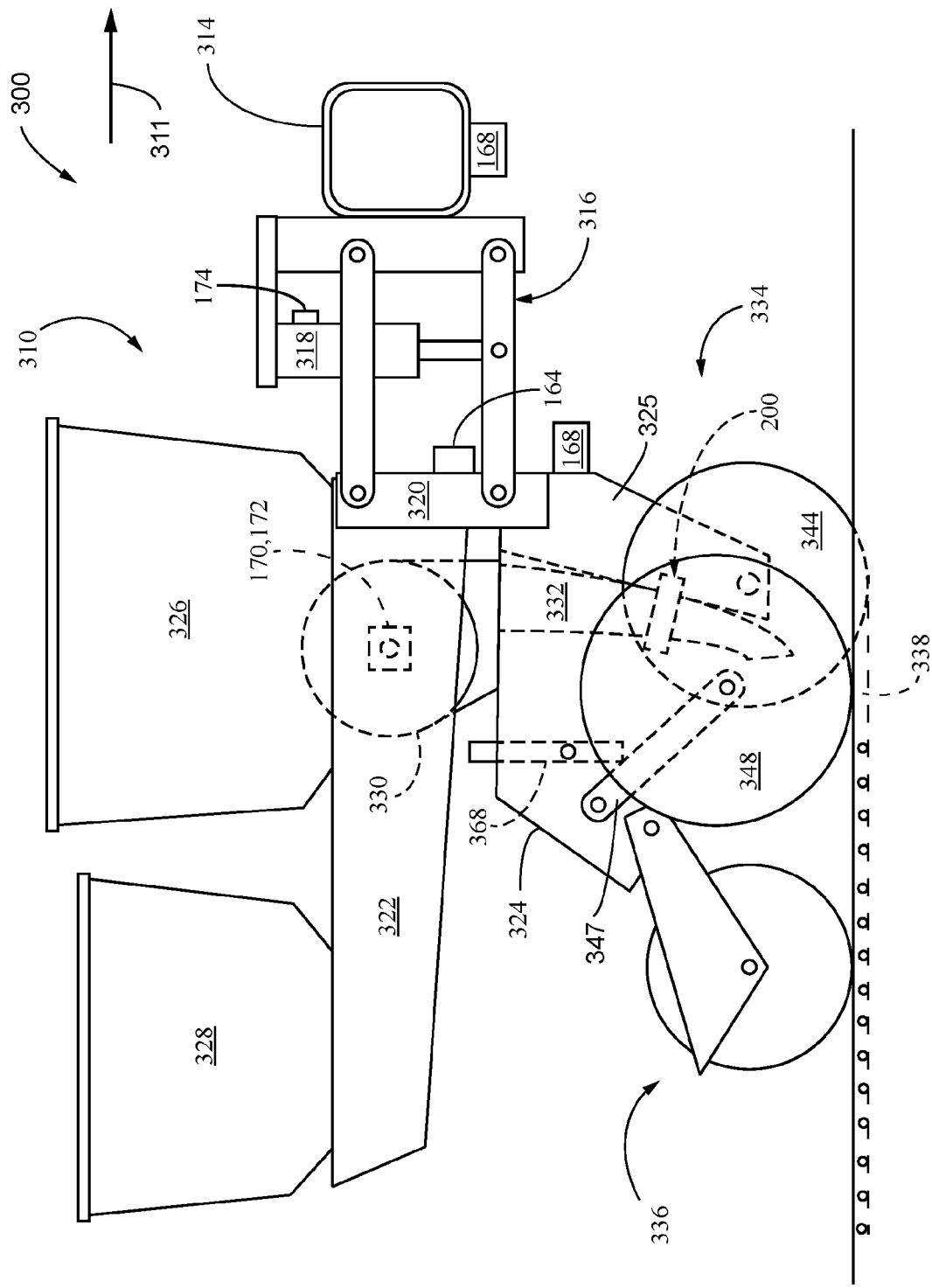
FIG. 13 is a side elevation view of a row unit of a singulating planter with a particle counter assembly disposed on a seed tube of the row unit.

It should be appreciated that the particles may be carried by an air stream through the passageway 202 or may fall through the passageway 202 by force of gravity. For example, as shown in FIGS. 11 and 12, the particle counter assembly 200 may be disposed in a distribution line 58 of an air seeder 10 (discussed later) or, as shown in FIG. 13, along a seed tube 332 of a row unit of a singulating planter 300 (discussed later). In such applications, the particle counter assembly 200 is used to detect and count the passage of seeds. In some air seeders, seeds and fertilizer (or other agricultural inputs) pass through the distribution lines 58 together, and so the particle counter assembly 200 may differentiate between seeds versus other agricultural inputs so only the seeds are counted. The particle counter assembly may also differentiate between seed and dirt or other debris passing through the air seeder distribution lines 58 of the air seeder 10 or seed tube 332 of singulating planters 300 so only the seeds are counted. Additionally, in such applications, the particle counter assembly 200 may be used to characterize the particles in order to differentiate between "good seed" and seed fragments so as to count only the "good seed" that is expected to germinate. While air seeders and singulating planters are two exemplary examples of applications for the particle counter assembly 200, it should be appreciated that the particle counter assembly 200 may be used in any other agricultural, industrial or commercial application where it is desired to count particles passing through a tube or passageway to detect and count only certain types of particles passing through a tube or passageway.

In the single array embodiment of the particle counter assembly 200A illustrated in FIGS. 1A and 2A, a single light plane 210-1 is generated across the passageway 202. The single light plane 210-1 is generated by an LED emitter array 212-1 disposed within an emitter housing 214-1 located on one side of the passageway 202. On the opposite side of the passageway 202 and directly opposing the LED emitter array 212-1 is a corresponding receiver array 216-1 disposed within a receiver housing 218-1.

In the double array embodiment of the particle counter assembly 200B illustrated in FIGS. 1B and 2B, two distinct light planes 210-1, 210-2 are generated across the passageway 202, with the light planes 210-1, 210-2 longitudinally offset from one another along the passageway 202 by a distance "D" such that a particle will sequentially pass through the first light plane 210-1 and then through the second light plane 210-2. Each light plane 210-1, 210-2 is generated by a respective LED emitter array 212-1, 212-2, with each array disposed within a respective emitter housing 214-1, 214-2 located on two sides of the passageway 202 oriented 90 degrees with respect to one another around the longitudinal axis 204 of the passageway 202 in order to detect the passage of particles in three dimensions. On the opposite sides of the passageway 202 and directly opposing each of the respective LED arrays 212-1, 212-2 is a corresponding receiver array 216-1, 216-2, with each receiver array 216-1, 216-2 disposed within a respective receiver housing 218-1, 218-2.

In either of the array embodiments 200A, 200B, the LED arrays 212-1, 212-2, as applicable, comprise a row of closely spaced LED emitters 220, each of which produces a light beam or light channel 222 across the width or diameter of the passageway 202. The respective receiver arrays 216-1, 216-2, as applicable, comprise a corresponding number of closely spaced photodiode receivers 224 which receive the light beams or light channels 222 of the opposing LED emitter 220. In one embodiment, the photodiode receivers 224 and LED emitters 220 are directly aligned with each other such that a line between them is perpendicular to each of the photodiode receivers 224 and the LED emitters 220. In other embodiments, the lines are not perpendicular.

In both embodiments 200A, 200B, the first LED array 212-1 is shown as having 12 LED emitters 220 producing light beams or light channels 222 (designated C1-C12) extending across the width or diameter of the passageway 202. In the double array embodiment 200B, the second LED array 212-2 is also shown as having 12 LED emitters 220 producing light beams or light channels 222 (designated C13-C24) extending across the width of the passageway 202 perpendicular to the light channels C1-C12 of the first LED array 212-1. Each corresponding receiver array 216-1, 216-2, as applicable, is shown as having 12 corresponding photodiodes 224. It should be appreciated that more or fewer LED emitters and photodiode receivers with greater or tighter spacings may be used. It should also be appreciated that LED's with wider or tighter beam angles and light intensities may be used depending on the particular application, including the width or diameter of the passageway 202 and the sizes of the particles to be detected passing through the passageway 202, and various other factors recognized by those of skill in the art. By way of example only, in applications for detecting seeds passing through distribution lines 58 of an air seeder 10, suitable LED emitters may be SM1206NHC-IL LED emitters available from Bivar, Inc. having beam angles of 30 degrees with the LED emitters 220 spaced at 0.08 inches (0.2 cm), and suitable photodiodes 224 may be TEMD7000X01 photodiodes available from Vishay Intertechnology, Inc. which may be spaced at 0.08 inches (0.2 cm). In the double array embodiment 200B, a suitable longitudinal offset distance "D" between the light planes 210-1, 210-2 may be 0.125 inches (0.32 cm), between 0.05 to 1 inch (0.13 to 2.5 cm), or between 0.1 to 0.5 inches (0.2 cm to 1.3 cm).

FIGS. 2A and 2B are intended to represent a snapshot of a group of seeds S1-S5 passing through a passageway 202, such as the distribution line 58 of an air seeder 10. It should be appreciated that in an air seeder application, the seeds are carried in an airstream through the distribution lines 58 at a relatively high rate of speed and in a substantially continuous stream (particularly when planting small seeds at high application rates such as canola, flax, millet, oats, wheat, rye, barley, etc.), so the snap shot illustration of the group of seeds in FIG. 2A or 2B is provided for simplicity for explaining the scan of the signals shown in FIG. 3A generated by that group of seeds passing through the single light plane 210-1 or the double light planes 210-1, 210-2 and the other processes carried out to analyze the signals for purposes of counting and characterizing the seeds as discussed later. While the following description refers to seeds for purposes of explaining the process in an air seeder or in a singulating planter application, it should be appreciated that the term "seeds" are used as an example only and therefore the term "seeds" should be understood as being interchangeable with the term particle.

Operation

As is known in the art, a photodiode consumes light energy to generate an electric current, with the voltage increasing proportionally to the light intensity. Thus, it should be appreciated that when a particle passes through a light channel 222 generated by an LED emitter 220, the aligned photodiode 224 will be momentarily "shadowed" resulting in a drop in signal voltage output. After the particle passes through the light channel 222, such that the light channel is completely unblocked, the output signal of the photodiode 224 will return to its maximum intensity.

The output signals of the photodiodes 224 of the single light plane 210-1 or double light planes 210-1, 210-2 are received by a controller 110 and are stored in memory for further processing. The controller 110 may be part of the Seed Monitoring System 100 (discussed later). The controller 110 may be disposed in the cab of a tractor pulling the air seeder 10, or singulating planter 300, as discussed later.

FIG. 3A represents a snapshot of the "raw" voltage signals ($V_{raw}$) generated by the photodiodes 224 and recorded by the controller 110 as the group of seeds S1-S5 pass through the first light plane 210-1 (i.e., channels C1-C12). The controller 110 records the output signals of each of the photodiodes 224 associated with each light channel 222 in sequential data cells over a series of data scans, with each of the sequential data cells for each of the light channels 222 arranged in parallel (i.e., in rows or columns). In the example of FIG. 3A, the snapshot includes a series of 50 data collection cycles or scans, with each row corresponding to one data collection cycle or scan, for each of the light channels 222 (C1-C12) organized by column. It should be appreciated that the output signals may alternatively be arranged with the data scans organized in sequential columns and the light channels 222 organized in rows. By way of example only, the data may be collected or scanned by the controller 110 at 10 kHz, but may be collected at higher or lower frequencies depending on the size and rate of passage of the particles to be detected and counted. Although not shown, it should be appreciated that for the double array embodiment 200B, a similar set of raw voltage data would be generated and collected by the controller 110 as the seeds S1-S5 pass through the second light plane 210-2 (i.e., channels C13-C24) oriented 90 degrees from the first light plane 210-1.

Data Normalization Process

Once the $V_{raw}$ signals are collected and stored in memory by the controller 110, the controller 110 runs a software program 101 to invert and "normalize" the $V_{raw}$ signals to values between 0 and 1 (unitless). FIG. 3B represents the same snapshot of FIG. 3A after the $V_{raw}$ signals have been inverted and normalized using the process described below, hereinafter referred to as the "Normalized Output Signal" or "NOS". The $V_{raw}$ signals are inverted and normalized such that when a light channel 222 is at its maximum light intensity (i.e., unblocked by a passing seed) the signal value is at 0. When the light channel 222 is at its lowest light intensity (i.e., completely blocked by a passing seed) the signal value is 1. Thus, signal values between 0 and 1 indicate that a light channel 222 is partially blocked by a passing seed.

To invert and normalize the raw signal voltage ($V_{raw}$) as represented in FIG. 3A for channels C1-C12 to produce the NOS data as represented in FIG. 3B for channels C1-C12, the following equation is used:

$$NOS = 1 - \frac{V_{raw} - V_b}{V_u - V_b}$$

Where:
NOS=Normalized Output Signal
$V_{raw}$=the actual detected voltage of the light channel 222
$V_b$=the average voltage when the light channel 222 is blocked
$V_u$=the average voltage when the light channel 222 is unblocked The value $V_b$ may be set as a constant (e.g., 0.025 volts) or $V_b$ may be an average of the voltage output of each photodiode 224 with its corresponding LED emitter 216 turned off.

The value $V_u$ may be a running first-in-first out (FIFO) buffer of 100 scans of the $V_{raw}$ data of each photodiode 224 when there is no particle passing through the respective light channel 222 (e.g., C1-C12) and wherein the $V_{raw}$ voltage has a change of less ±0.01V from the previous scan to the current scan.

It should be appreciated that for the double array embodiment 200B, the process for generating the NOS data for the channels C13-C24 is the same as described above for channels C1-C12.

Referring to FIG. 2, the seeds are numbered S1-S5 from the earliest (lowest) seed to the latest (highest) seed. When the earliest single seed S1 passes through the first light plane 210-1, the NOS values are generated as shown in FIG. 3B as a small cluster of joined cells having values between 0.1 to 1 across a series of columns (channels C2-C4 in this example) and across a series of scan rows (rows 3-17 in this example). It should be noted that the earliest scan (i.e., scan row 1) is at the bottom of FIGS. 3A and 3B. Continuing to refer to FIG. 2, when the group of seeds S2-S5 (which are in close proximity to one another and with seeds S2, S3 and seeds S2, S4 and seeds S4, 25 overlapping or touching) pass through the first light plane 210-1, NOS values are generated as shown in FIG. 3B as a large cluster of joined cells having values between 0.2 to 1 across a series of columns (channels C4-C10 in this example) and across a series of scan rows (rows 15-48 in this example). Each cluster of NOS values between 0.2 to 1 is referred to as a "Master Event." Thus, it should be appreciated that a Master Event may comprise a single discrete seed (such as seed S1) or a Master Event may comprise multiple seeds (such as seeds S2-S5) passing through the light planes 210-1 in close proximity. For the double array embodiment 200B, a similar set of Master Events will be generated for the seeds subsequently passing through the channels C13-C24 of the second light plane 210-2 (not shown)

Identifying Master Events

Once the NOS data is generated, the controller 110 utilizes the software program 101 to analyze the NOS data to identify the cell clusters and to associate each cell cluster with a unique identification for further processing as discussed later. In order to differentiate between cell clusters and to associate each cell cluster as a distinct Master Event, the NOS data is analyzed to identify when each channel C1-C12 has a first occurrence of cell having an NOS value greater than a predefined minimum value (e.g., 0.15) indicating a seed is starting to pass through that channel (i.e., a "start-state") and when each channel C1-C12 has a last occurrence of an NOS cell having a value greater than a predetermined minimum value (e.g., 0.15) indicating that the seed has passed through the channel (i.e., a "stop-state"). All directly joining cells across all columns between a start state and a stop state, constitutes a single cell cluster and defines a single Master Event. It should be appreciated that for the double array embodiment 200B, the process for differentiating between cell clusters and to associate each cell cluster as a distinct Master Event for the channels C13-C24 is the same as described above for channels C1-C12.

Start/Stop State Identification Process

Figure 4:
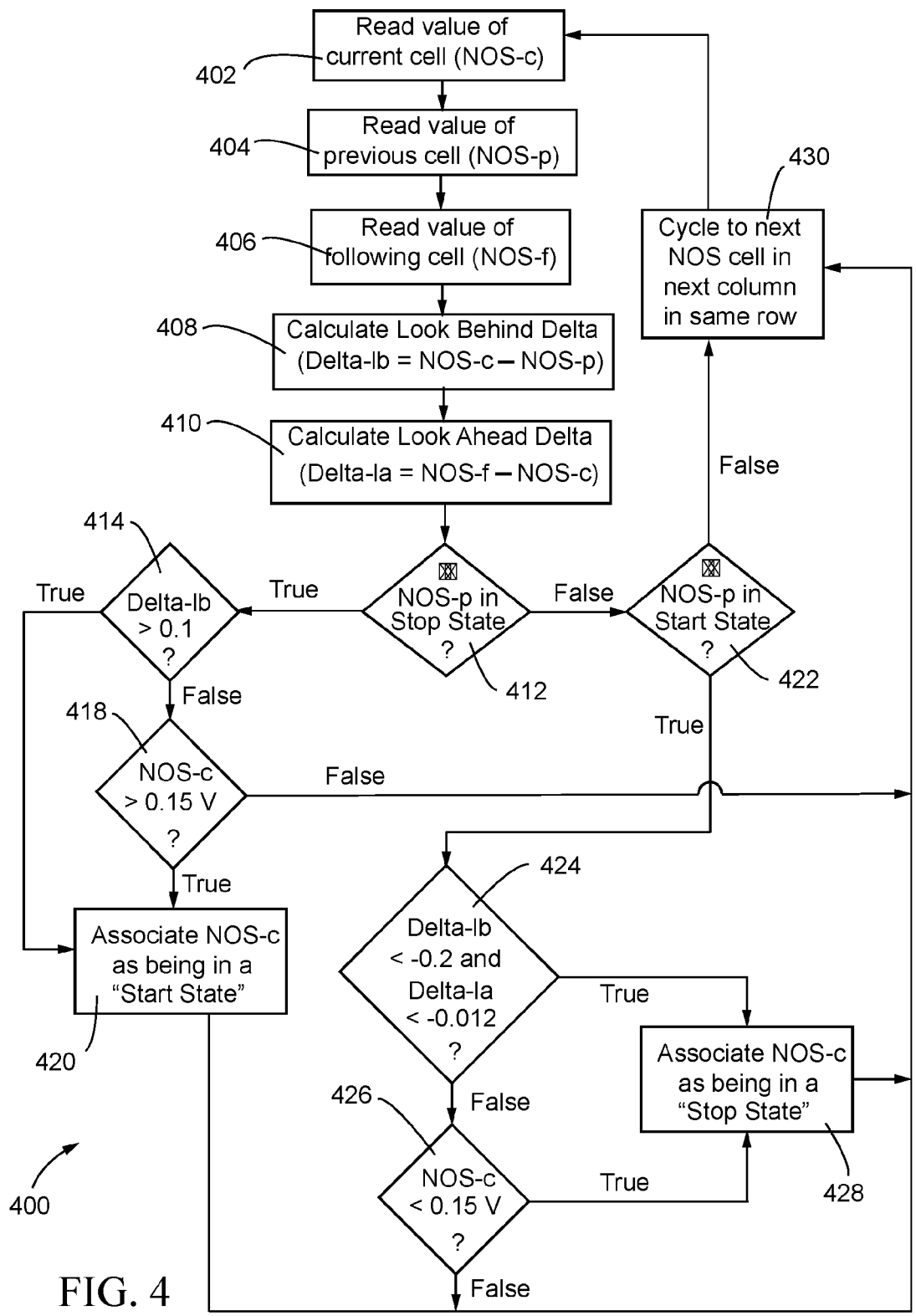
FIG. 4 is a logic flowchart of a process for identifying start-states and stop-states of the NOS scan of FIG. 3B for defining and labeling Master Events.

To identify a start-state for each column channel and a stop-state for each column channel, the Start/Stop State Identification Process 400 of FIG. 4 is performed by the software program 101 of the controller 110. For purposes of this discussion, only the NOS values for channels C1-C12 are discussed. For the double array embodiment 200B, the same process is performed for channels C13-C24.

Referring to FIG. 4, at initial step 402, the NOS data cell being analyzed for a particular channel, i.e., the current NOS cell (NOS-c), is read and stored in memory and is initially assumed to be in a stop-state until otherwise defined as set forth herein. At step 404, the immediately preceding NOS cell (NOS-p) for that channel is read and stored in memory. At step 406, the immediate following NOS cell (NOS-f) for that channel is read and stored in memory. At step 408, the Look Behind Delta (Delta-lb) for that channel is calculated by subtracting the value of the NOS-p cell from the value of the NOS-c cell. The calculated Delta-lb is stored in memory.

At step 410, the Look Ahead Delta (Delta-la) for that channel is calculated by subtracting the value of the NOS-c cell signal from the value of the NOS-f cell. The Delta-la value is stored in memory. At step 412, the memory is searched to identify the associated state (i.e., start-state or stop-state) for the NOS-p cell from the previous cycle. If the NOS-p cell is in a stop-state (i.e., the answer under step 412 is true), the program proceeds to step 414.

At step 414, if the Delta-lb value is greater than 0.1 (i.e., the equation is true), the NOS-c cell is associated as being in a start-state at step 420 and the associated state is recorded in memory. The program will then jump to step 430 for cycling to the next NOS cell in the next column in the same scan row. It should be appreciated that when the program jumps to the next NOS cell in the next column of the same row, the cell that had been the NOS-f cell in the prior cycle now becomes the NOS-c cell in the new cycle. Likewise, the cell that had been the NOS-c cell in the prior cycle now becomes the NOS-p cell in the new cycle. Returning to step 414, if the equation under step 414 is false, the NOS-c signal is further analyzed under step 418.

At step 418, if the NOS-c value is greater than 0.15 volts (i.e., the equation is true), the NOS-c cell is associated as being in a start-state at step 420 and the associated state is recorded in memory. The program will then jump to step 430 for cycling to the next NOS cell of the next column in the same scan row. If, however, the equation under step 418 is false, the program proceeds to step 430 for cycling to the next NOS cell of the next column in the same scan row.

Returning to step 412, if the NOS-p cell is not in a stop-state (i.e., the answer under step 412 is false), the program proceeds to step 422. Under step 422, if the NOS-p cell is in a start state (i.e., the answer to step 422 is true), then the program proceeds to step 424. Under step 424, if the Delta-lb value is less than −0.2 and the Delta-la value is less than −0.012 (i.e., the equation is true), the NOS-c cell is associated at step 428 as being in a stop-state and its associated state is recorded in memory. The program will then jump to step 430 for cycling to the next NOS cell of the next column in the same scan row. If, however, the equation under step 424 is false, the NOS-c cell is further analyzed at step 426.

At step 426, if the value of NOS-c cell is less than 0.15 volts (i.e., the equation is true), the NOS-c cell is associated as being in a stop-state at step 428 and its associated state is recorded in memory. The program will then jump to step 430 for cycling to the next NOS cell of the next column in the same scan row. If, however, the equation at step 426 is false, the program will then jump to step 430 for cycling to the next NOS cell of the next column in the same scan row.

The process is repeated for each of the cells in the row across all column channels (C1-C12). When a scan row is completed, the program jumps to the next scan row and repeats the process for each of the cells in that row across all columns (C1-C12), and so on, thereby identifying each start-state and each stop-state.

Once the start-state cell and stop-state cell is identified for each column channel, all of the cells within that column from the start-state cell to the stop-state cell are associated as being a column cluster. Additionally, all column clusters that are directly joined by at least one cell are then associated as being part of a Master Event. All of the cells comprising that Master Event are then assigned a unique Master Event label generated by the program and stored in memory for later reference discussed below. For example, the unique Master Event label may be an integer and each subsequent Master Event may be assigned the next sequential integer, such that each Master Event has a unique identifier in increments of one integer.

For example, as shown in FIG. 3B, the cluster of directly adjoining cells after the earliest start cell (i.e., the lowest start cell) defines the first Master Event in the scan. As shown in FIG. 7, all of the adjoining cells comprising that Master Event are labeled with the integer 999. The next cluster of directly adjoining cells after the next earliest start cell defines the next Master Event and each of the adjoining cells comprising that Master Event are shown in FIG. 7 as being labeled with the next sequential integer 1000.

For the double array embodiment 200B, the same process is repeated for the NOS data scan with respect to channels C13-C24 of the second light plane 210-2. As discussed later, it should be appreciated that the second light plane 210-2 (which is oriented 90 degrees from the first light plane 210-1), may result in an NOS data scan that produces differences in the identified seed clusters due to the differences in proximity and overlapping relations of the seeds in the two-dimensional scan of the second light plane 210-2. Thus, these differences in seed clusters, may resulting in differences in numbering of Master Events due to the differences between the start states and stop states being identified during Start/Stop Identification Process 400 for the seed clusters when "viewed" in the orientation of the second light plane 210-2. These differences are taken into account during the Group Comparison Process 900A, 900B discussed later.

Master Event Analysis

Figure 5:
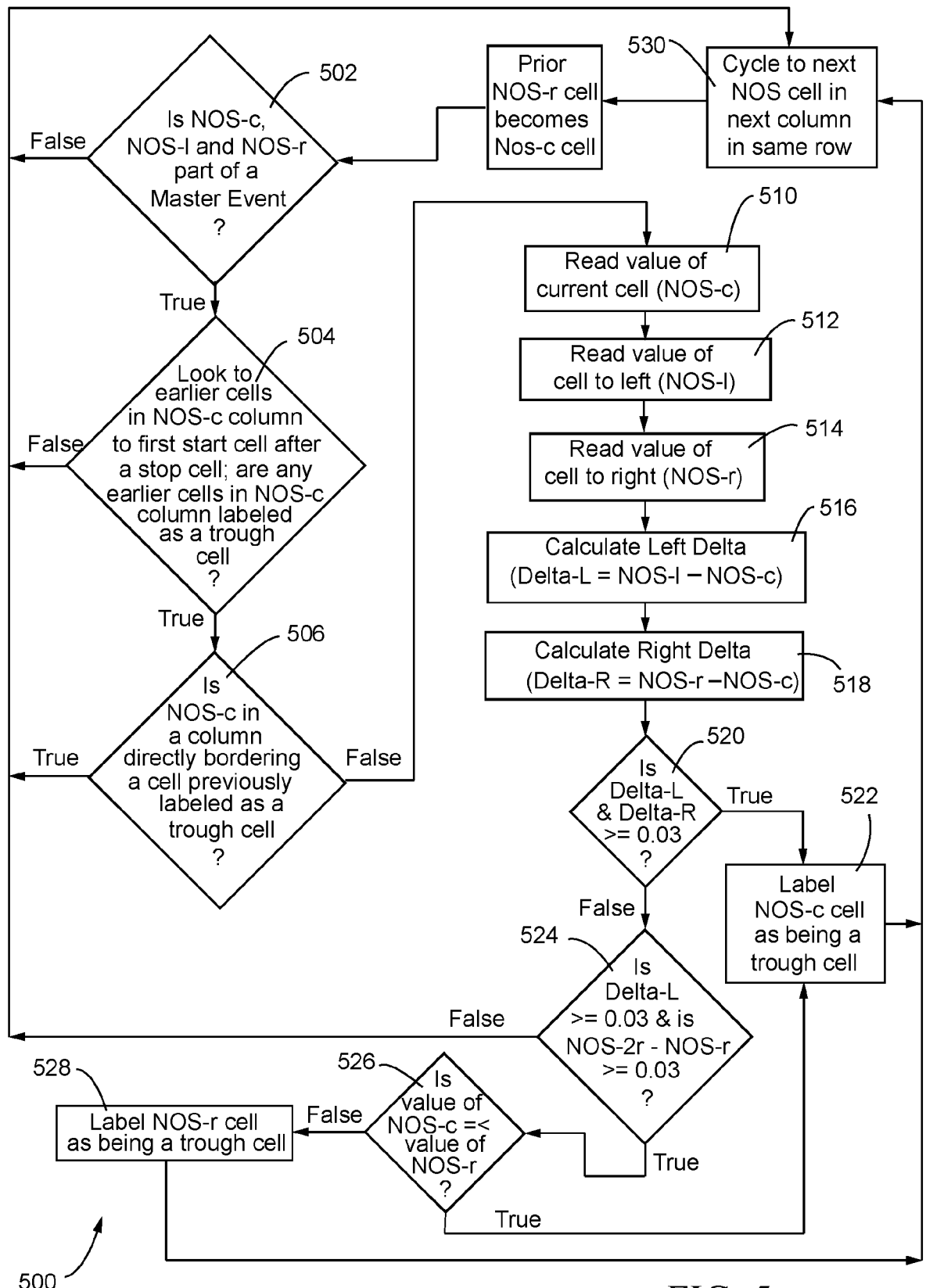
FIG. 5 is a logic flowchart of a process for identifying trough cells in the NOS scan of FIG. 3B.

In order to obtain an accurate seed count, the scan of NOS data is further analyzed to determine if a Master Event corresponds to a single seed or if the Master Event comprises one or more seeds via the Master Event Analysis Process 500 of FIG. 5. The Master Event Analysis Process 500 involves two sub-processes: (A) identification of "trough columns" to determine if the Master Event needs to be further divided or split into separate Events; and (B) labeling each of the separate Events with a unique identifier for later reference. The Master Event Analysis Process 500 (and each of its sub-processes) is performed by the controller 110 of the Monitoring System 100 (discussed later) via the software program 101. For purposes of describing the Master Event Analysis Process 500 (and each of its sub-processes), only the scan of channels C1-C12 are discussed. However, it should be appreciated that for the double array embodiment 200B, the same Process 500 is performed for channels C13-C24.

A. Trough Column Identification Process

A "trough column" is where the value of an NOS cell is lower than the values of the NOS cells immediately to the left and right of the current NOS cell being analyzed. In general, where a lower NOS value is identified between two high value NOS cells in adjacent columns, it suggests that two seeds are passing through the light plane 210-1 in a side-by-side relation in very close proximity to one another or in a partially overlapping relation. For example, if the signal voltage cluster generated by the passing of two seeds are thought of as mountains or plateaus, the trough columns are the valleys between the mountains or plateaus which distinguish between the two seeds. The trough column only includes the cells within the scan of NOS data which connect the cluster of cells comprising a Master Event on the left and right side of the current NOS cell (NOS-c) being analyzed. Referring to the NOS data scan of FIG. 3B, there are no trough columns in Master Event 999, but there are three trough columns 1000A, 1000B, 1000C shown within Master Event 1000. Due to the presence of trough columns in Master Event 1000, it needs to divided into separate Events as will be explained later under the Master Event Splitting and Labeling Process 600, but first, the process for identifying trough columns is explained below.

Referring to FIG. 3B and the logic flow chart of FIG. 5, trough columns are identified by analyzing each cell across each scan row of the channel columns (C1-C12) before moving to the next scan row. At initial step 502, it is first determined if the NOS cell being analyzed (i.e., the current NOS cell (NOS-c)) and the NOS cell to its immediate left (NOS-l) and the NOS cell to its immediate right (NOS-r) are associated with a Master Event (as described above). If the NOS-c cell has not been previously associated with a Master Event, the program jumps to step 530 to analyze the next NOS cell in the next column in the same scan row. If the answer at step 502 is true, the program proceeds to step 504 and analyzes the NOS data scan to identify the first start-cell after a stop-cell in that column to determine if any NOS cells after the identified start-cell in that column up to the NOS-c cell have been labeled as a trough cell (as explained below). If the answer at step 504 is false, the program jumps to step 530. If the answer at step 504 is true, the program proceeds to step 506.

For example, referring to FIG. 3B, assume that the cell at scan row 23 in channel or column 5 (hereinafter referenced as r26:c5) is the current cell being analyzed (i.e., the NOS-c cell). At step 502, NOS-c cell r26:c5 was previously associated with Master Event label 1000, and the cell to its immediate right (i.e., the NOS-r cell at r26:c6) was also previously associated with Master Event label 1000. However the cell to the immediate left (i.e., the NOS-1 cell r26:c4) is not associated with any Master Event so the answer at step 502 is false, and the program jumps to step 530 and proceeds to the next cell in the same row in the next column. It should be appreciated that if the cells to either the right or left of the NOS-c cell is not associated with the same Master Event, the NOS-c cell cannot be a trough cell. Moving to the cell at r26:c7 as NOS-c cell, and repeating step 502, the cell at r26:c7 was previously associated with Master Event label 1000, and the cell to its immediate right (i.e., the NOS-r cell at r26:c8) was also previously associated with Master Event label 1000. Likewise, the cell to its immediate left (i.e., cell r26:c6) was also associated with Master Event 1000 so the answer at step 502 is true and the program proceeds to step 504. At step 504, the program looks to earlier scans in the same column (i.e., column 7) to the first start cell in that column (which in this case is the NOS-c cell at r26:c7) and identifies that there have been no cells earlier than r26:c7 that have previously been labeled as a trough cell because the earliest trough cell determines the trough column. Because the answer at step 504 with respect to cell r26:c7 is true, the program proceeds to step 506.

At step 506, the NOS data scan is analyzed to determine if the NOS-c cell is in a column directly bordering an NOS cell that has previously labeled as a trough cell (explained below). If the answer at step 506 is true, the program jumps to step 530. If the answer at step 506 is false, the program proceeds to step 510. Referring to the previous example with respect to the cell at r26:c7, the program confirms that the cell at r26:c7 does not border any cells previously labeled as a trough cell, because two trough cells or trough columns cannot be side-by-side. Because the answer at step 506 with respect to cell r26:c7 is true, the program proceeds to step 510.

At step 510, the program reads and stores in memory the value of the NOS-c cell. At step 512, the program reads and stores in memory the value of the NOS cell to its immediate left (NOS-l). At step 514, the program reads and stores in memory the value of the NOS cell to its immediate right (NOS-r). At step 516, the program calculates the "Delta-L value" which is the value of the difference between the value of the NOS-1 cell and the NOS-c cell. At step 518, the program calculates the "Delta-R value" which is the value of the difference between the value of the NOS-r cell and the NOS-c cell. Referring to the previous example with respect to the NOS-c cell at r26:c7, its value in FIG. 3B is 0.2; the NOS-1 value at cell r26:c6 is 0.8; the NOS-r value of cell r26:c8 is 0.2, and thus the Delta-L value is 0.6 (i.e., 0.8-02) and the Delta-R value is 0 (i.e., 0.2-0.2).

At step 520, if the Delta-L value and the Delta-R value is greater than or equal to 0.03 (i.e., the equation is true), the program at step 522 associates the NOS-c cell as being a "trough cell" which is stored in memory. The program then jumps to step 530 for cycling to the next NOS cell in the next column in the same scan row. If either the Delta-L value or the Delta-R value is less than 0.03 (i.e., the equation at step 520 is false), the program proceeds to step 524. Referring to the previous example with respect to the cell at r26:c7, although the Delta-L value of 0.6 calculated above is greater than 0.03, the Delta-R value of 0 is less than 0.03, so the program proceeds to step 524.

At step 524, the program identifies the value of NOS cell two columns to the right (NOS-2r) of the NOS-c cell and determines the "Delta-2R value" which is the value of the difference between the value of NOS-2r cell and the NOS-r cell. If the Delta-2R value is greater than or equal to 0.03 and the Delta-L value is greater than or equal to 0.03 (i.e., both equations are true), the program proceeds to step 526. However, if either equation in step 524 is false, the program jumps to step 530. Referring to the previous example with respect to the cell at r26:c7, the value of the NOS-2r cell (i.e., the cell r26:c9) is 1.0. Thus, because the value of Delta-L value of 0.6 is greater than or equal to 0.03 and the Delta-2R value of 0.8 (i.e., 1.0-0.2) is greater than or equal to 0.03, the equation is true and the program proceeds to step 526.

At step 526, the program determines if the NOS-c value is less than or equal to the NOS-r value. If true, the NOS-c cell is associated and stored in memory as being a trough cell at step 522. Referring to the previous example with respect to the cell at r26:c7, because the value of cell r26:c7 is equal to the value of r26:c8, the equation is true and so cell r26:c7 is labeled as a trough cell. The program then moves to cell r23:c10. If the answer at step 526 is false, the NOS-r cell is associated and stored in memory as being a trough cell at step 528.

The program then proceeds to step 530 by cycling to the next column to the right in the same scan row. Upon cycling to the next column, it should be appreciated that the cell that had been the NOS-r cell in the prior cycle, will become the NOS-c cell in the new cycle and the cell that had been the NOS-c cell from the prior cycle, will becomes the NOS-1 cell in the new cycle.

The foregoing process is repeated for each of the cells in the row across all column channels (C1-C12). When a scan row is completed, the program jumps to the next scan row and repeats the process for each of the cells in that row across all columns (C1-C12), and so on, thereby identifying all trough cells. All directly adjoining trough cells comprise a trough column.

For the double array embodiment 200B, the same process is repeated for the NOS data scan with respect to channels C13-C24 of the second light plane 210-2. As discussed earlier, it should be appreciated that the second light plane 210-2 (which is oriented 90 degrees from the first light plane 210-1), may result in an NOS data scan that produces differences in the identified seed clusters due to the differences in proximity and overlapping relations of the seeds in the two-dimensional scan of the second light plane 210-2. Thus, these differences in seed clusters, may result in differences in numbering of Master Events due to the differences between the start states and stop states being identified during Start/Stop Identification Process 400 for the seed clusters when "viewed" in the orientation of the second light plane 210-2. Additionally, due to the 90 degree difference in orientation of the first and second light plane 210-1, 210-2 different trough columns may be identified for the respective Master Events. For example, referring to FIG. 2B, the second light plane 210-2 may detect a space or trough column between seeds not detected in the two-dimensional "view" of the first light plane 210-1 during the Trough Column Identification Process 500 for channels C13-C24.

B. Master Event Splitting and Labeling Process

Figure 8C:
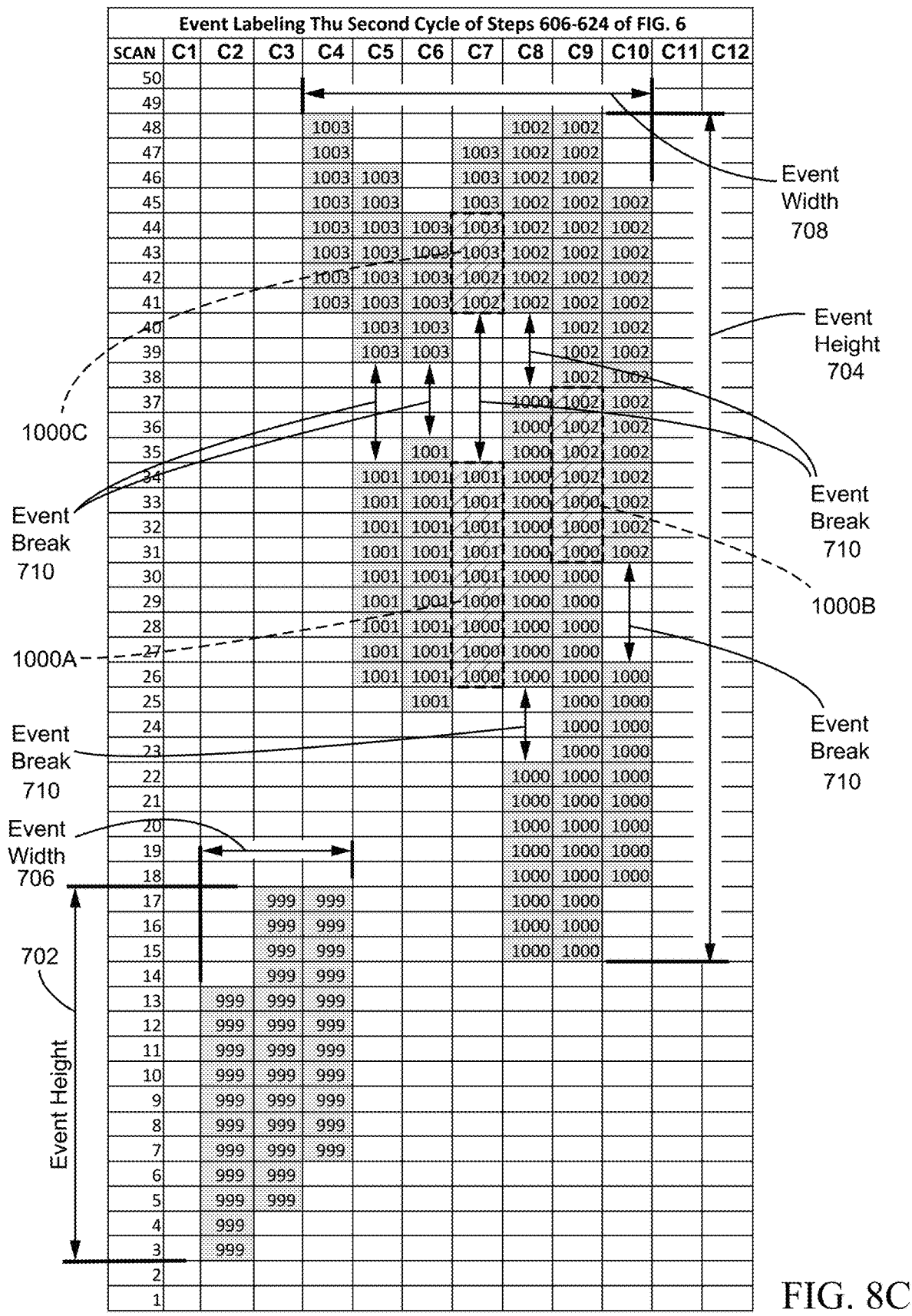
FIG. 8C is a representation of the further splitting of the Master Event and further labeling of the split Events after identification of the second trough column.

FIG. 7 shows the original Master Event labels 999 and 1000 assigned under the Master Event Identification Process 400 with the trough columns 1000A, 1000B, 1000C identified pursuant to the Trough Column Identification Process 400 described above. FIG. 8A shows the Master Event 1000 of FIG. 7 initially split into two separate Events labeled 1000 and 1001 pursuant to the Master Event Splitting and Labeling Process 600 (discussed below). FIG. 8B shows the Master Event 1000 further split into three Events 1000, 1001, 1002 pursuant to the Master Event Splitting and Labeling Process 600 (discussed below). And FIG. 8C shows the Master Event 1000 further split into four Events 1000, 1001, 1002, 1003 pursuant to the Master Event Splitting and Labeling Process 600 (discussed below).

Figure 6:
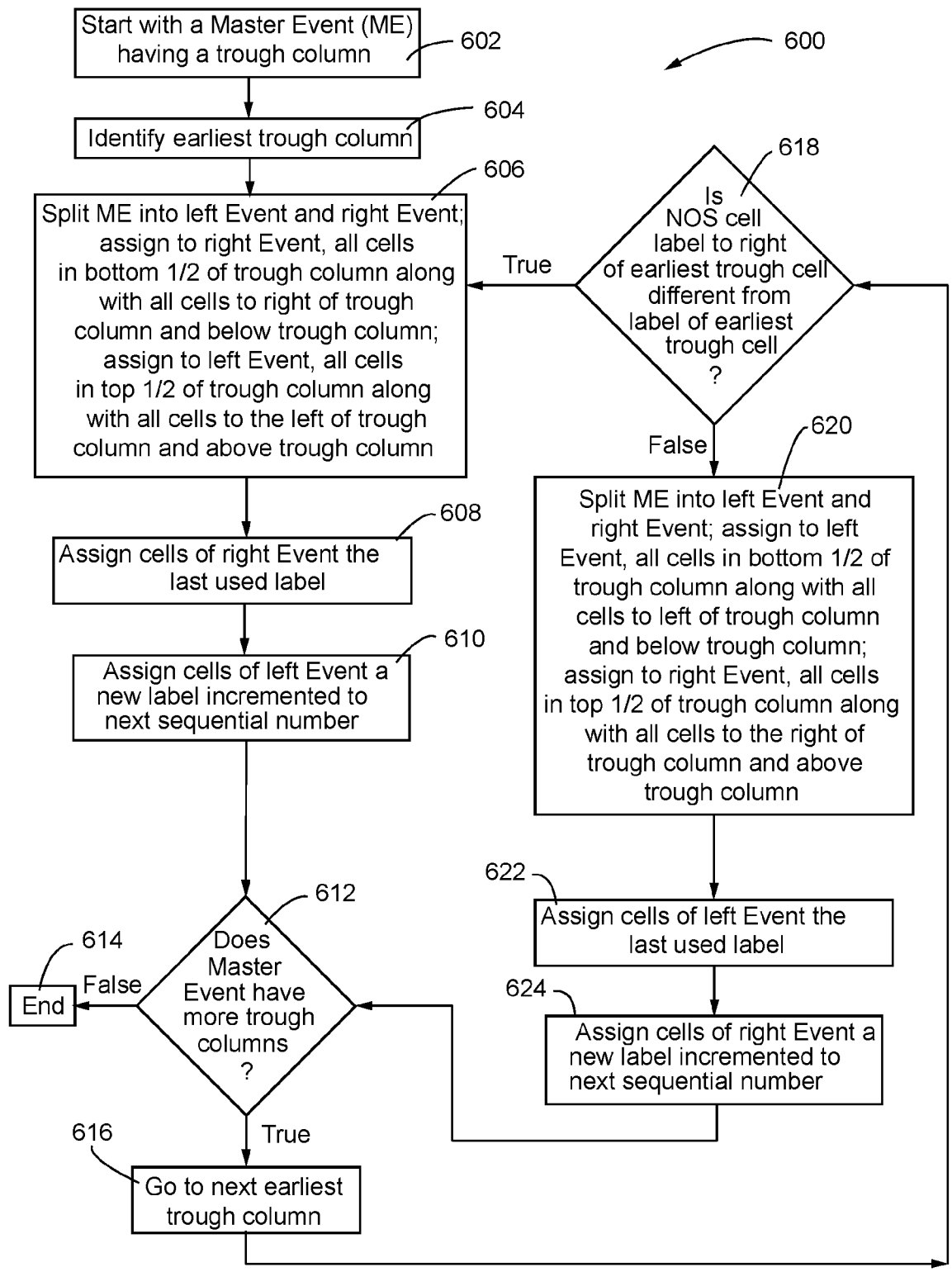
FIG. 6 is a logic flowchart of a process for splitting Master Events and labeling the split Events.

Once the trough columns (if any) in a Master Event have been identified, the program performs the Master Event Split Process 600 as represented by the logic flowchart of FIG. 6. If no trough columns are present in the Master Event, the Master Event Split and Labeling Process 600 is skipped for that Master Event and the program proceeds to determine metrics of the Events (discussed later).

Referring to FIG. 6, at initial step 602, the NOS data scan is analyzed to identify the earliest Master Event having a trough column, which, in reference to FIG. 7, is the Master Event labeled 1000. At step 604, the program identifies the earliest (i.e., lowest) trough cell within that Master Event, which, in FIG. 8A, is the trough cell 1000A at scan row 26 in column C7 (i.e., r26:c7).

At step 606, the program splits the Master Event into two separate Events (i.e., a left Event and a right Event). All the cells in the Master Event to the right of the trough column along with all the cells in the bottom half of the trough column are associated with the right Event. All the cells to the left of the trough column and above the trough column along with the cells in the top half of the trough column are associated with the left Event.

At step 608, all of the cells associated with the right Event are assigned the same label last used. At step 610, all of the cells associated with the left Event are assigned a new label that is incremented to the next sequential integer. In the example of FIG. 8A, it can be seen that all of the cells to the right of the first trough column 1000A and the cells comprising the bottom half of trough column 1000A retain their original label (i.e., label 1000). All of the cells to the left of trough column 1000A and above trough column 1000A, as well as the top half of trough column 1000A are labeled with the next sequential integer (i.e., 1001).

The program then proceeds to step 612 to identify if the Master Event includes other trough columns. If there are no other trough column in the Master Event (i.e., the answer at step 612 is false) the Master Event Split and Labeling Process ends and program proceeds to the process of determining Event Metrics discussed later. If there are other trough columns in the Master Event (i.e., the answer at step 612 is true), the program proceeds to step 616 and moves to the next earliest trough column (i.e., the trough column with the next lowest trough cell). Referring to FIG. 8A, the next earliest trough column is trough column 1000B.

After moving to the next trough column, at step 618 the program identifies if the label associated with the cell to the right of the earliest trough cell is different from the label of the earliest trough cell. If the answer at step 618 is true, the process under steps 606 through 612 as described above is repeated. If the answer at step 618 is false, the program proceeds to step 620. In the example of FIG. 8A, the cells to the right of the earliest trough cell (i.e., the cell at r31:c9) in column 1000B has the same label (i.e., 1000) as the earliest trough cell. Accordingly, the answer at step 618 is false, so the program proceeds to step 620.

At step 620, the program again splits the Master Event into two separate Events (i.e., a left Event and a right Event). All the cells in the Master Event to the left of the trough column, below the trough column and the bottom half of the trough column are associated with the left Event. All the cells in the Master Event to the right of the trough column, above the trough column and the top half of the trough column are associated with the right Event.

At step 622, all of the cells associated with the left Event are assigned the same label last used. At step 624, all of the cells associated with the right Event are assigned a new label that is incremented to the next sequential integer. Referring now to FIG. 8B, it can be seen that all of the cells to the left of trough column 1000B and the cells comprising the bottom half of trough column 1000B retain their original labels (i.e., labels 1000 and 1001). All of the cells to the right of trough column 1000B and above trough column 1000B, as well as the top half of trough column 1000B are labeled with the next sequential integer (i.e., 1002).

The program then proceeds to step 612 to identify if the Master Event includes other trough columns. If there are no other trough column in the Master Event (i.e., the answer at step 612 is false) the Master Event Split and Labeling Process ends and program proceeds to the process of determining Event Metrics discussed later. If there are other trough columns in the Master Event (i.e., the answer at step 612 is true), the program proceeds to step 616 and moves to the next earliest trough column (i.e., the trough column with the next lowest trough cell). Referring to FIG. 8B, the next earliest trough column is trough column 1000C.

After moving to the next trough column, the program repeats step 618 and the respective steps therefrom. In the example of FIG. 8B, the cells to the right of the earliest trough cell (i.e., the cell at r41:c7) in trough column 1000C has a different label (i.e., 1000) from that of the earliest trough cell. Accordingly, the answer at step 618 is true, so the program proceeds to step 606.

At step 606, the program splits the Master Event into two separate Events (i.e., a left Event and a right Event). All the cells in the Master Event to the right of the trough column along with all the cells in the bottom half of the trough column are associated with the right Event. All the cells to the left of the trough column and above the trough column along with the cells in the top half of the trough column are associated with the left Event.

At step 608, all of the cells associated with the right Event are assigned the same label last used. At step 610, all of the cells associated with the left Event are assigned a new label that is incremented to the next sequential integer. Referring now to FIG. 8C, it can be seen that all of the cells to the right of trough column 1000C and the cells comprising the bottom half of trough column 1000C are assigned the last label used (i.e., 1002). All of the cells to the left of trough column 1000C and above trough column 1000C, as well as the top half of trough column 1000C are labeled with the next sequential integer (i.e., 1003).

The program then proceeds to step 612 to identify if the Master Event includes other trough columns. If there are no other trough column in the Master Event (i.e., the answer at step 612 is false) the Master Event Split and Labeling Process ends and program proceeds to the process of determining Event Metrics discussed later. If there are other trough columns in the Master Event (i.e., the answer at step 612 is true), the program proceeds to step 616 and moves to the next earliest trough column (i.e., the trough column with the next lowest trough cell). Referring to FIG. 8C, there are no other trough columns, so the Master Event Split and Labeling process ends and the program proceeds to the process of determining Event Metrics discussed below.

For the double array embodiment 200B, the same process is repeated for the NOS data scan with respect to channels C13-C24 of the second light plane 210-2. As discussed earlier, it should be appreciated that the second light plane 210-2 (which is oriented 90 degrees from the first light plane 210-1), may result in an NOS data scan that produces differences in the identified seed clusters due to the differences in proximity and overlapping relations of the seeds in the two-dimensional scan of the second light plane 210-2. Thus, these differences in seed clusters may not only result in differences in numbering of Master Events due to the differences between the start states and stop states being identified during Start/Stop Identification Process 400 for the seed clusters when "viewed" in the orientation of the second light plane 210-2, but the 90 degree different orientation of the first and second light plane 210-1, 210-2 may result in different trough columns being identified for the respective Master Events1 during the Trough Column Identification Process 500 for channels C13-C24. As a result in the differences in trough columns, there may be differences in the splitting and labeling of the Events during the Master Event Splitting and Event Labeling Process 600. These differences are taken into account during the Group Comparison Process 900A, 900B discussed later.

Determining Event Metrics

After completing the Master Event Splitting and Event Labeling Process 600, the program determines several metrics of each Event which is used during the Group Comparison Process 900A, 900B discussed later, including Event Time, Event Width, Event Breaks, Event Voltage Volume and Event Distance.

The Event Time is the total time of a Master Event from the time at the last scan row of the Master Event minus the time at the first scan row of the Master Event. Referring to FIG. 8C, the Event Time for Master Event 999 is identified by reference number 702 and the Event Time for Master Event 1000 is identified by reference number 704.

Event Width is the total width of the Master Event defined by the channels 222 (C1-C12) having a value in the NOS cells multiplied by the spacing of the channels 222. Referring to FIG. 8C, the Event Width for Master Event 999 is identified by reference number 706 and the Event Width for the original Master Event 1000 (now split into separate Events 1000, 1001, 1002, 1003) is identified by reference number 708.

Event Breaks is the total number of times any channel in any Master Event goes from a start-state to a stop-state and back to a start-state. Referring to FIG. 8C, there are no Event Breaks within the Master Event 999. However, in original Master Event 1000 (now split into separate Events 1000, 1001, 1002, 1003) the Event Breaks are identified by reference number 710.

Event Voltage Volume is the sum of the values of the NOS cells of the Master Event multiplied by the Group Speed (discussed in more detail below).

Event Distanceis the true distance which is the Event Time multiplied by the Group Speed (discussed in more detail below).

Grouping Master Events

The Master Events are grouped for purposes of: (a) comparing seed counts over a given Scan Window, and (b) calculating the Group Speed. A Scan Window starts when the earliest Master Event starts and the Scan Window runs until a predefined number of scans with no seeds being detected (e.g., no NOS value greater than 0.15 is detected) after a last stop-state for the joined cluster of NOS cells defining that Master Event. For example, if the predetermined number of scans of no seeds being detected after the last stop-state of the earliest Master Event is assumed to be 10 scans, the Scan Window will end after a 10-scan gap of no seeds being detected. In other words, using the assumed 10 scan gap, if the scan rate is at 10 kHz, the Scan Window will end 1 msec, after the last stop-state of the earliest Master Event starting the Scan Window. All of the Master Events captured within that Scan Window are referred to as a "Master Event Group" or "Group" for short.

The speed of the Group ("Group Speed") is determined differently depending on whether the single array embodiment 200A is being used or whether the double array embodiment 200B is being used. For the double array embodiment 200B, because there are two light planes 210-1, 210-2, Group Speed can be accurately calculated by determining the change in time between the first light plane 210-1 and the second light plane 210-2 detecting the first Master Event in a Group, divided by the distance between the light planes 210-1, 210-2 (e.g., 0.125 inches in the embodiment described above). The average speed for the passing seeds may be calculated using a first-in-first-out (FIFO) buffer over a predetermined number of Groups (e.g., 3000).

For the single array embodiment 200A, because there is only one light plane 210-1, the Group Speed is calculated using the Event Width mode divided by the Event Time mode. As the name implies, the Event Width mode is the most common Event Width for the Group over a predetermined rolling number of Master Events (i.e., the most common number of channels 222 having a value in the NOS cells occurring over a predetermined number of Events, multiplied by the spacing of the channels 222). Likewise the Event Time mode, as the name implies, is the most common time Event Time occurring over a predetermined number of Master Events. The purpose of using the mode is to obtain the average measurement of width and time of a single Master Event, under the assumption that the Master Event will most commonly be comprised of a single particle.

As identified above, the Event Voltage Volume and the Event Distance is calculated using the Group Speed (calculated by either of the above described methods depending on whether the single array embodiment 200A or the double array embodiment 200B is being utilized). In the double array embodiment 200B, which produces a speed for each cluster of cells (indicating a seed or group of seeds), an additional filter can be applied where there is an exception made for the Event Voltage Volume and Event Distance if the calculated Group Speed is greater than 2.5 times the average speed. In such occurrences, the cluster of cells defining the Master Event is likely debris. For such occurrences, the average speed is used for any events other than the first Master Event in a Group.

Histograms of Metrics

To characterize the product flowing through the sensor assembly 200, the most frequently occurring modes of Event Voltage Volume (EVV), Event Distance and Event Width are determined and stored using histograms for the single light plane 210-1 (for the single array embodiment 200A) or for each light plane 210-1, 210-2 (for the double array embodiment 200B). This is done using a predetermined FIFO buffer (e.g., 3000 Master Events).

A histogram of the EVV is set to have 30 bins or intervals that include only the lowest 90% of the Master Events. The Voltage Volume Mode (VVM) is found by taking the average of the 4 tallest bins or intervals.

A histogram of the Event Distance is set to have 20 bins or intervals that include only the lowest 90% of Master Events. The DistanceMode is found by taking the average of the 4 tallest bins or intervals.

A histogram of the Event Width is set to have a range of bins or intervals from 0 to 13. The Width Mode is found by taking the average of the two tallest bins or intervals.

Characterizing Master Events

Figure 9:
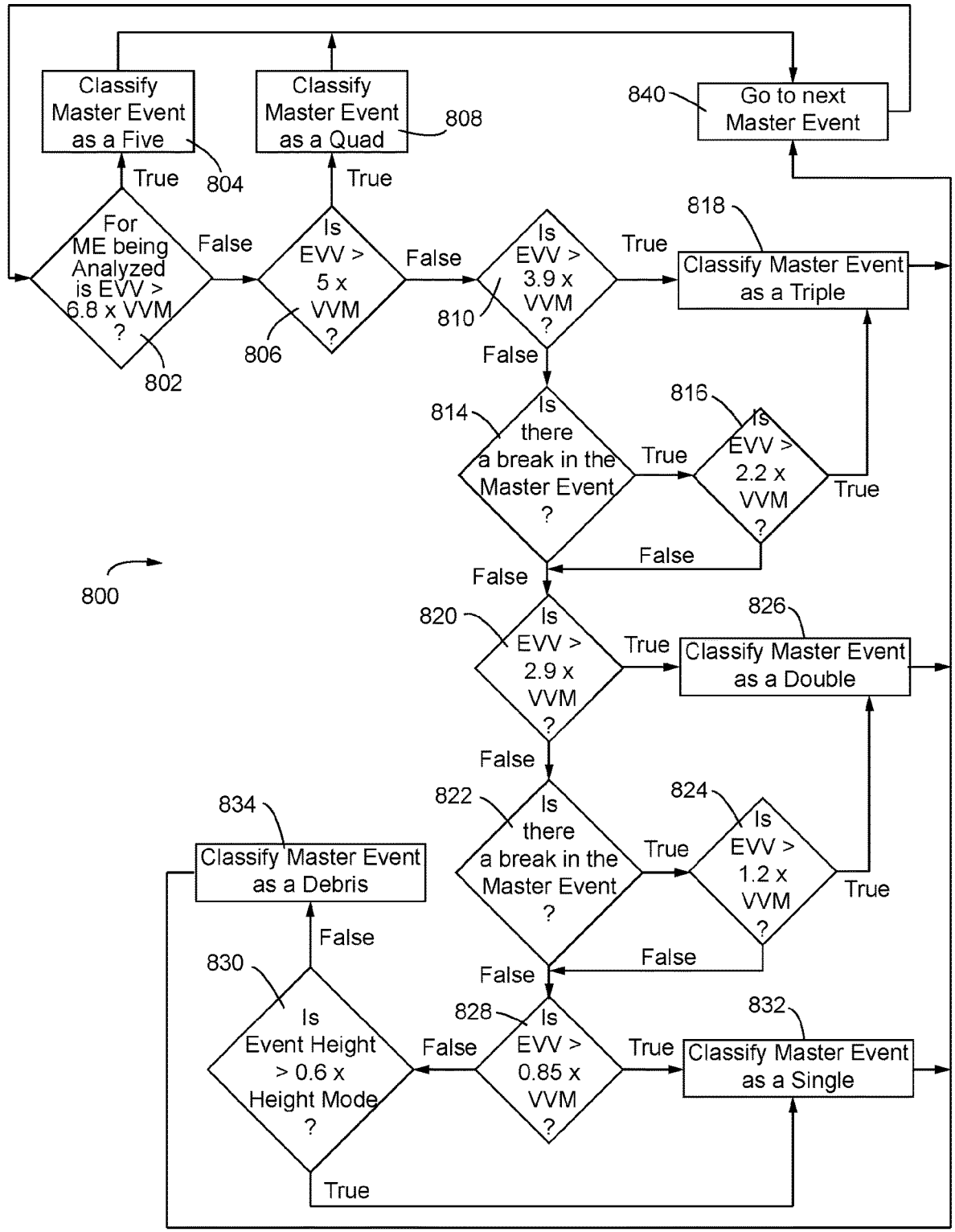
FIG. 9 is a logic flowchart of a process for characterizing Master Events.

FIG. 9 is a logic flowchart of the Characterization Process 800 for characterizing a Master Event as a "Five" (i.e., five seeds), a "Quad" (i.e. four seeds), a "Triple" (i.e., three seeds), a "Double" (i.e., two seeds), a "Single" (i.e., one seed) or debris. Under the logic flowchart of the FIG. 9, the program first checks to determine if the Master Event satisfies the criteria for being classified as a Five, then as a Quad, then as a Triple, then a Double, then a Single, then as debris. Once a Master Event is classified as meeting the criteria for one of these classifications, the program breaks out of the loop and proceeds to the next Master Event. In the example calculations provided below for characterizing the Master Event as a Five, a Quad, a Triple, a Double, a Single, or as debris, the values for the Event Voltage Volume (EVV) were empirically selected to differentiate between numbers of seeds within a Master Event. Other EVV values may be more accurate for estimating numbers of seeds within a Master Event, and therefore the EVV values provided in the example calculations should be considered non-limiting EVV values for purposes of characterizing a Master Event when estimating the actual numbers of seeds comprising the Master Event.

At step 802, if the Event Voltage Volume (EVV) is greater than 6.8 times the Voltage Volume Mode (VVM), such that the equation at step 802 is true, the program classifies the Master Event as a Five at step 804 and the program then jumps to step 840 to characterize the next Master Event. If the equation at step 802 is false, the program proceeds to step 806. At step 806, if the EVV is greater than 5 times the VVM, such that the equation at step 806 is true, the program classifies the Master Event as a Quad at step 808 and the program then jumps to step 840 to characterize the next Master Event. If the equation at step 806 is false, the program proceeds to step 810.

At step 810, if the EVV is greater than 3.9 times the VVM, such that the equation at step 810 is true, the program classifies the Master Event as a Triple at step 818 and the program then jumps to step 840 to characterize the next Master Event. If the equation at step 810 is false, the program proceeds to step 814 to check if the Master Event includes a break (i.e., a start, to stop, to start transition). If the Master Event includes a break, the program proceeds to step 816 to check if the EVV is greater than 2.2 times the VVM, if both step 814 and step 816 are true, the program classifies the Master Event as a Triple at step 818 and the program then jumps to step 840 to characterize the next Master Event. If either step 814 or step 816 is false, the program proceeds to step 820.

At step 820, if the EVV is greater than 2.9 times the VVM such that the equation at step 820 is true, the program classifies the Master Event as a Double at step 826 and the program jumps to step 840 to characterize the next Master Event. If the equation at step 820 is false, the program proceeds to step 822 to check if the Master Event includes a break (start, to stop to start transition). If the Master Event includes a break, the program proceeds to step 824 to check if the EVV is greater than 1.2 times the VVM, if both step 822 and step 824 are true, the program classifies the Master Event as a Double at step 826 and the program then jumps to step 840 to characterize the next Master Event. If either step 822 or step 824 is false, the program proceeds to step 828.

At step 828, if the EVV is greater than 0.85 times the VVM such that the equation at step 828 is true, the program classifies the Master Event as a Single at step 832 and the program then jumps to step 840 to characterize the next Master Event. If the equation at step 828 is false, the program proceeds to step 830 to check if the Event Distance is greater than 0.6 times the Distance Mode. If the equation at step 830 is true, the program classifies the Master Event as a Single at step 832 and the program then jumps to step 840 to characterize the next Master Event. If the equation at step 830 is false, the program classifies the Master Event as debris at step 834 and the program then jumps to step 840 to characterize the next Master Event.

Group Comparison Process

Figure 10A:
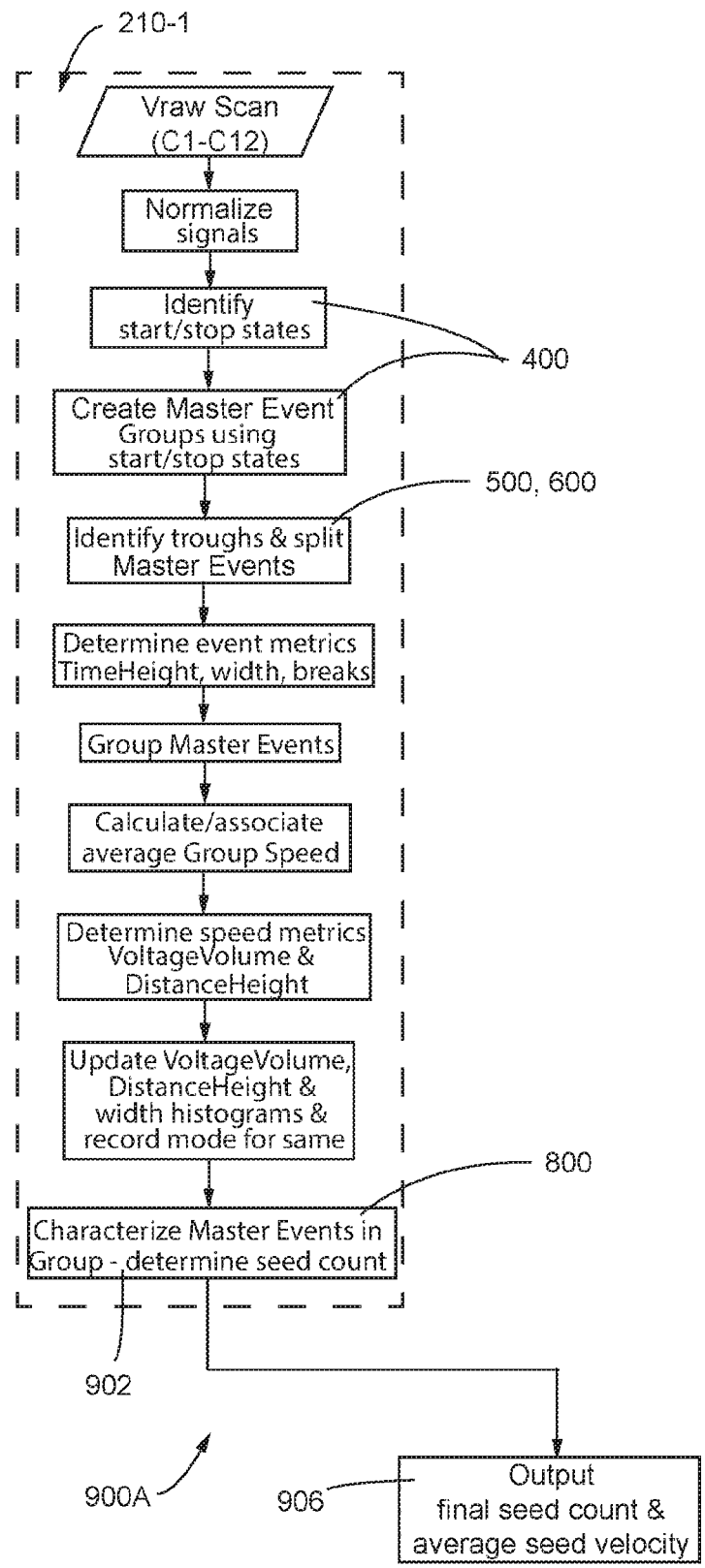
FIG. 10A is a diagram summarizing the process for analyzing the Group resulting from the light plane of the single array to arrive at a final seed count and seed velocity for output and display.
Figure 10B:
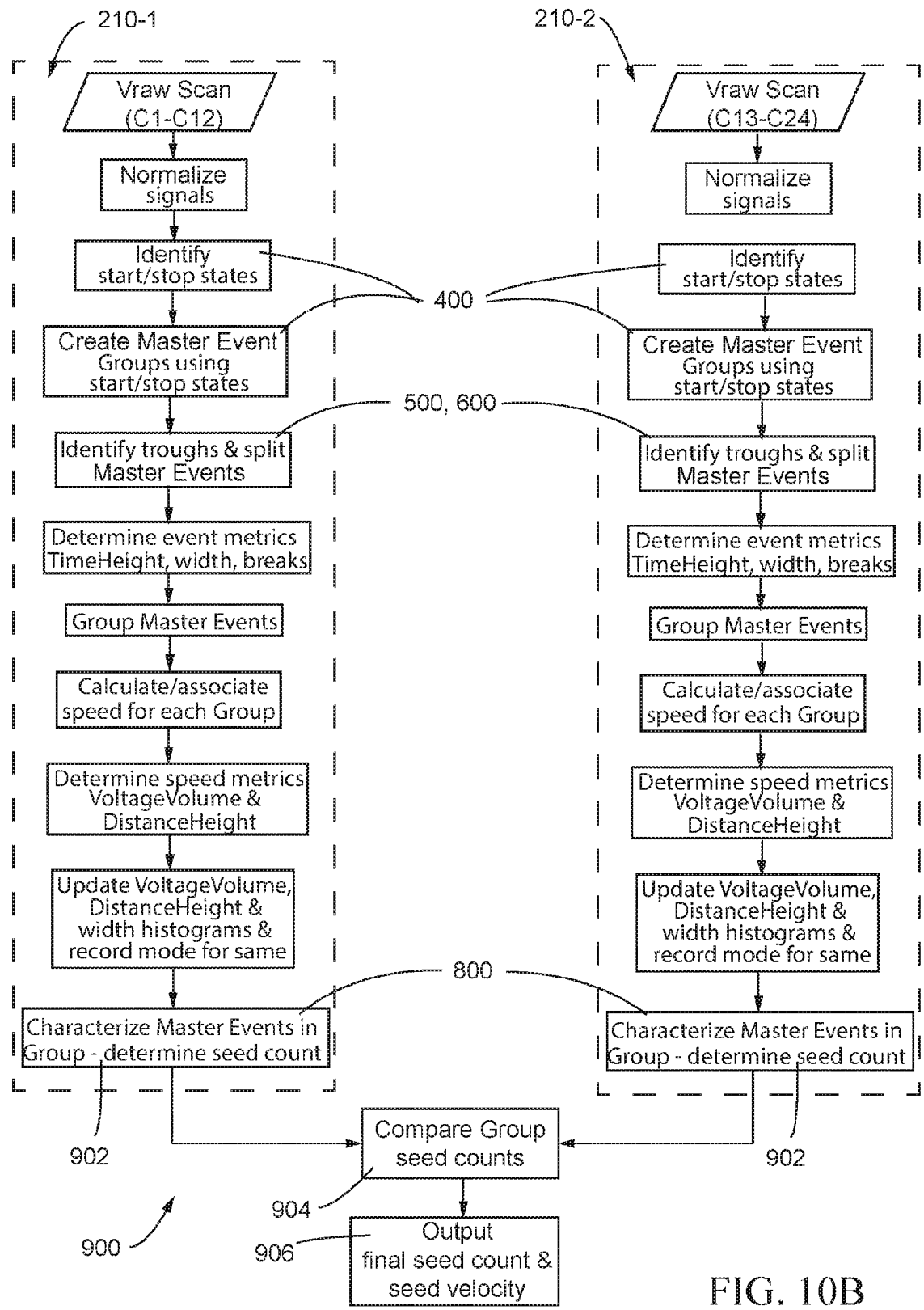
FIG. 10B is a diagram summarizing the process for comparing the Groups resulting from each of the light planes of the double array embodiment to arrive at a final seed count and seed velocity for output and display.

FIGS. 10A and 10B illustrate the Group Comparison Process 900A, 900B respectively. It should be appreciated that FIG. 10A illustrates the Group Comparison Process 900A for the single array embodiment 200A because it illustrates the steps for only one light plane 210-1, whereas FIG. 10B illustrates the Group Comparison Process 900B for the double array embodiment 200B because it illustrates the steps for both light planes 210-1, 210-2. The Group Comparison Process 900A, 900B is performed by the program after completing the processes 400, 500, 600, 800 and their respective intermediate processes described above with respect to the data generated by the light plane 210-1 (for the single array embodiment 200A) or the data generated by each of the light planes 210-1, 210-2 (for the double array embodiment 200B). In both FIGS. 10A and 10B, at step 902, the number of distinct Events within each Group (e.g., Events 999, 1000, 1001, 1002, 1003 in FIG. 8C) are summed to determine a Group seed count. The number of the summed discrete Events of each Group are assumed to be the number of seeds comprising the Group.

For the double array embodiment 200B, an additional step 904 is performed, whereby the total Group seed count from each light plane 210-1, 210-2 is compared and the greater number is stored in memory as the seed count for that Group. For example, the Group for the first light plane 210-1 has identified five distinct Events (i.e., 999, 1000, 1001, 1002, 1003) corresponding to five seeds. However, the second light plane 210-2 may not split the seed groups S2-S5 into four separate events because the light plane 210-2 may not identify three trough channels if the seeds are arranged in such a way that the scan by the second light plane identifies only two trough channels. Thus, in this example, the second light plane 210-2 may only identify four distinct events, corresponding to four seeds. Under step 904, the seed count from the first light plane identifying the greater number of seeds (i.e., five seeds) would then be used for the total Group seed count.

At step 906 after the total Group seed count has been determined and after the Group Speed has been determined (by either of the methods described above for the single array embodiment 200A or the double array embodiment 200B), the final Group seed count and the average speed of the seeds are then output to the display device 130 of the Monitoring System 100 for viewing by the operator.

It should be appreciated that the use of a double array embodiment 200B may improve the accuracy of the seed count because the second light plane 210-2 is able to differentiate between seeds in a third dimension that may not otherwise be differentiated and counted when using a single array embodiment with a single light plane that is only capable of detecting seeds in a two-dimensional space. Thus, because the double array embodiment takes into account the greater seed count detected between the two light planes, the double array embodiment 200B will generally be more accurate than a single array embodiment 200A. However, the use of a second light plane 210-2 requires twice the processing power over the use of a single light plane (e.g., 12 inputs versus 24 inputs in the example provided). Based on testing, the seed count using the single array embodiment 200A was shown to have 90% seed count accuracy (i.e., the seed count measured was within 10% of the true seed count). The double array embodiment 200B increased the seed count accuracy to 97% (i.e., the seed count measured was within 3% of the true seed count). However, for air seeders, even a 90% seed count accuracy is extremely accurate. Accordingly, in view of the additional processing power required for a double array embodiment 200B, utilizing a single array embodiment 200A may be adequate for many, if not most, air seeder applications.

Air Seeder

FIG. 11 is a side elevation view of a conventional air seeder 10 such as the type as disclosed in U.S. Patent Publication No. US2010/0264163 and U.S. Pat. No. 8,695,396, both of which are incorporated herein in their entireties by reference. FIG. 12 is a schematic illustration of the air seeder 10 of FIG. 11 showing the particle counter assembly 200 disposed on a distribution line 58 of the air seeder 10. The air seeding system 10 is shown as comprising an air cart 11 and a ground engaging implement 24. The air cart 11, includes holding tanks 12, 14 for holding seed, fertilizer or other granular product for delivery to the soil. The holding tanks 12, 14 are mounted on a frame 16 supported by ground wheels 18 for forward movement over the ground by a towing vehicle (not shown) connected to a forward hitch 20. The ground engaging implement 24 includes a frame 26 supported by ground wheels 28 and connected to the rear of the air cart frame 16 by a hitch 30. The frame 26 supports a plurality of row units 60. In alternative arrangements, the ground engaging implement 24 may be in front of the air cart 11 or the ground engaging implement 24 and air cart 11 may be combined onto a common frame. Thus, all references to an air seeding system 10 or an "air seeder" 10, for short, are intended to encompass each of the foregoing arrangements.

Air Seeder Operation

Referring to FIG. 12, the air seeder 10 includes an air distribution system 34 such as disclosed in U.S. Pat. No. 6,213,690, which is incorporated herein in its entirety by reference. The air distribution system 34 includes a fan 36 for directing air through a main conduit 38. A metering mechanism 40 is located at the bottom of each tank 12, 14 for delivering metered amounts of seed, fertilizer or other granular products through product passages 42, 44 from the respective tanks 12, 14 into main conduits 38 (only one main conduit 38 is shown in FIGS. 10 and 11). The product metered by the metering mechanism 40 into the main conduits 38 is carried by the air stream to a downstream distribution tower 50. Typically, there will be one tower 50 for each main conduit 38. Additionally, separate main conduits 38 may be provided for each of the respective tanks, such that different products within those respective tanks 12, 14 may be distributed separately to a respective tower 50 for delivery via separate distribution lines 58 to individual row units 60 as described below. Alternatively, the product from the respective tanks 12, 14 may be combined in a common main conduit 38 as shown in FIG. 12 for distribution together. While two tanks 12, 14 are shown with the associated metering mechanisms 40 and main conduits 38, it should be appreciated that any number of tanks, metering mechanisms 40 and main conduits 38, may be provided on the air seeder 10 as desired.

The metering mechanism 40 may be a volumetric metering mechanism, but may be any other suitable metering mechanism that is known in the art or hereinafter developed. As identified above, the product passages 42, 44 direct the product from the metering mechanism 40 into the main conduits 38 which carry the product in the air stream to the downstream distribution towers 50. Each tower 50 includes an uppermost distributing head 52 located at the uppermost end of a vertical distribution tube 54. The head 52 evenly divides the flow of product into a number of distribution lines 58. Each distribution line 58 delivers product to a downstream row unit 60. The row unit 60 opens a furrow 62 in the soil surface. The distribution line deposits the product into the furrow 62 and a trailing firming or closing wheel 64 (FIG. 11) firms the soil over the deposited product. Although the row unit 60 shown in FIGS. 11 and 12 shows a shank with a point for opening the furrow 62, and shows only one distribution line 58 to each row unit 60, it should be appreciated that the row unit 60 may be a single pass, double-shoot row unit utilizing a cutting disc and boot with dual distribution lines 58 for delivering seed and fertilizer to the soil, such as disclosed in U.S. Pat. Nos. 8,275,525, 9,826,667 and 9,968,030, each of which is incorporated herein in its entirety by reference, and which are commercially embodied in the Case 500 Series air seeder.

Continuing to refer to FIG. 12, the metering mechanisms 40 include variable speed meter drives 72, 74 connected to respective product meters 76, 78 located in the bottom of the respective tanks 12, 14. As the drives 72, 74 rotate the respective meters 76, 78, the product from the respective tanks 12, 14 is delivered via the respective product passages 42, 44 into the main conduit 38 which, in turn, conveys the product to the distribution tower 50. A feed rate controller 84 is connected to the variable speed meter drives 72, 74.

The feed rate controller 84 is in signal communication with the controller 110 of a monitoring system 100 (discussed later). In addition to the controller 110 running the software program 101 to perform each of the processes, 400, 500, 600, 800, 900 described above, the controller 110 is also in communication with a speed sensor 168 which detects the ground speed of the air seeder 10. The controller 110 controls the feed rate controller 84 to adjust the meter drive speeds to maintain a selected product feed rate with changing ground speed. In an alternative embodiment, the feed rate controller 84 may be coupled so as to be ground driven through a transmission with an output ratio that is adjustable from the cab of the tractor. The controller 110 is also in communication with the GPS receiver 166, 131. The controller 110 controls the feed rate controller 84 to adjust metering rates depending upon the air seeder's location within the field. As discussed below, the monitoring system 100 includes an input device, such as graphical user interface (GUI) 112, to allow the operator to enter a desired product feed rate such as pounds per acre or seeds per acre, etc.

Singulating Row Crop Planter

FIG. 13 is a side elevation view of one of a plurality of row units 310 of a conventional row crop planter 300 showing the particle counter system 200 disposed on a seed tube 332 of the row unit 310 for counting the seeds as they fall by gravity through the seed tube 332. Each row unit 310 is supported from the toolbar 314 by a parallel linkage 316 which permits each row unit to move vertically independently of the toolbar and the other spaced row units in order to accommodate changes in terrain or upon the row unit encountering a rock or other obstruction as the planter is drawn through the field. Each row unit 310 may include a front mounting bracket 320 to which is mounted a hopper support beam 322 and a subframe 324. The hopper support beam 322 supports a seed hopper 326 and a fertilizer hopper 328 as well as operably supporting a seed meter 330 and a seed tube 332. The subframe 324 includes a downwardly extending shank 325 which operably supports a furrow opening assembly 334. A furrow closing assembly 336 is operably supported by a rearward end of the subframe 324. The furrow opening assembly 334 may include one or more furrow opening discs 344 operably supported from the shank 325. The furrow opening assembly 334 may include one or more gauge wheels 348 operably supported from the subframe 324 by pivotal gauge wheel arms. A depth adjuster 368 is selectively positionable to vary the depth of the furrow opening discs 344 with respect to the gauge wheels 348 in order to vary the depth of the furrow formed by the furrow opening discs.

A ride quality sensor 364, which may be an accelerometer, may be mounted to the row unit 300 and disposed to measure the vertical velocity and acceleration of the row unit 310. Speed sensors 168, such as radar speed sensors or GPS speed sensors, may be mounted to the toolbar 314 or to the row unit 300. A downforce actuator 318, such as an air bag, hydraulic or pneumatic cylinder or the like, acts on the parallel linkage 316 to exert a downforce on the row unit 300. A downforce valve 174, such as an electrically operated servo valve, may control the amount of downforce applied by the downforce actuator 318.

In operation, as the planter 300 advances in the forward direction of travel as indicated by arrow 311, the furrow opening assembly 334 cuts a furrow 338 into the soil surface. The seed hopper 326, which holds the seeds to be planted, communicates a constant supply of seed to the seed meter 330. In an alternative embodiment the singulating planter 300 may be a central-fill planter including a frame-mounted bulk hopper as is known in the art; in such embodiments the seed hopper 326 may comprise a small auxiliary hopper in seed communication with the bulk hopper. The seed meter 330 is selectively engaged to the drive 172 via the clutch 170 such that individual seeds are metered and discharged into the seed tube 332 at regularly spaced intervals based on the seed population desired and the speed at which the planter 300 is drawn through the field. The drive 172 and clutch 170 may be of the types disclosed in U.S. Pat. No. 8,307,771 incorporated herein in its entirety by reference. In other embodiments, the clutch 170 is omitted and the drives 172 comprise electric drives such as those disclosed in Applicant's International Publication No. WO2017/011355, incorporated herein in its entirety by reference. The particle sensor assembly 200 is supported by the seed tube 332 and detects the passage of seeds through the seed tube 332. The seed drops from the end of the seed tube 332 into the furrow 338 and the seeds are covered with soil by the closing wheel assembly 336. As in the air seeder embodiment, in the singulating planter embodiment 300, the display device 130, communication module 120, and controller 110 may be mounted in a cab of the tractor drawing the singulating planter 300 through the field. One or more speed sensors 168, such as a hall-effect wheel speed sensor or a radar speed sensor, may also be mounted to the tractor.

Monitoring System.

Figure 14:
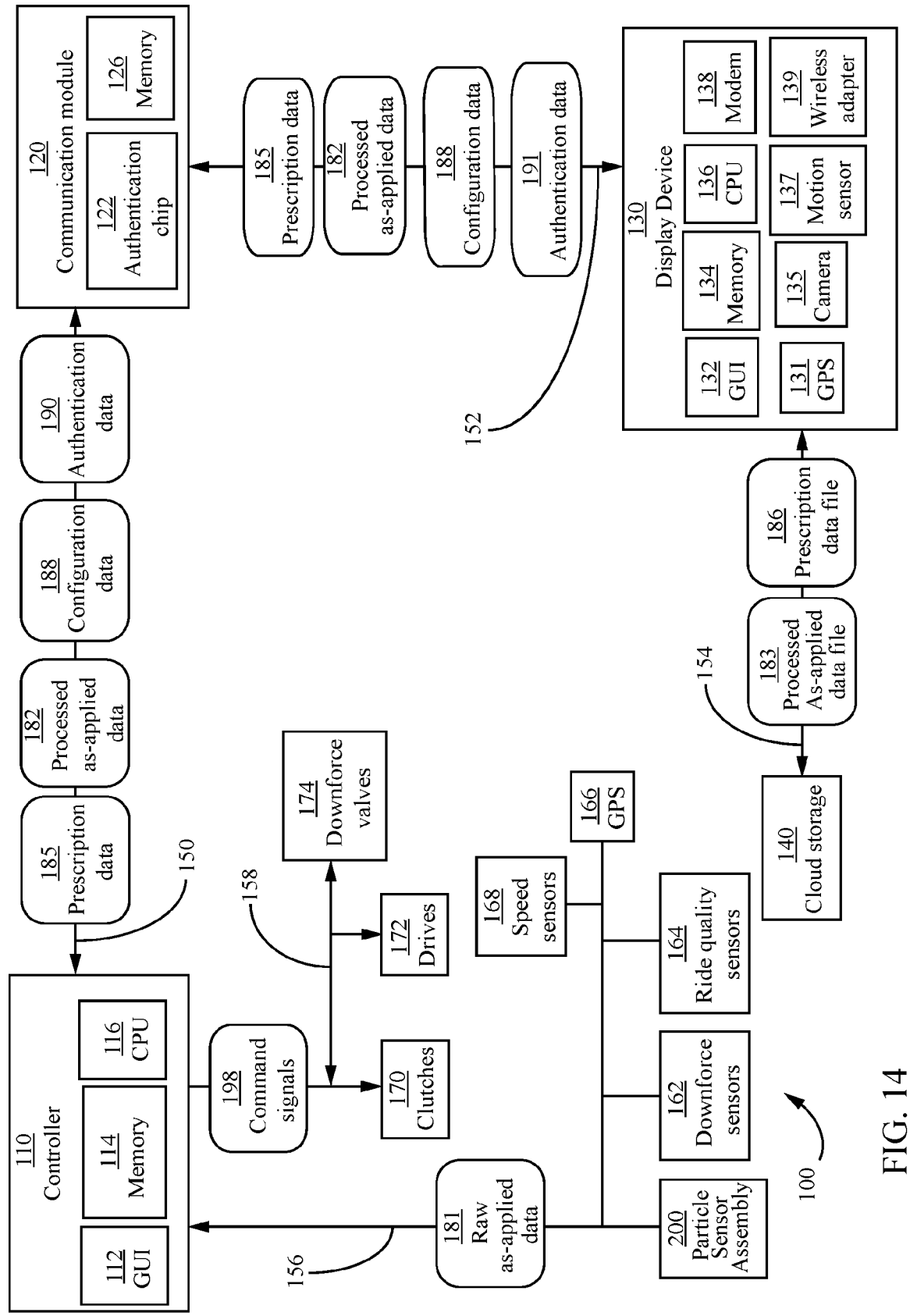
FIG. 14 is a schematic illustration of an embodiment of a monitoring system showing data communication with the particle counter assembly and other components that may be used with the air seeder of FIG. 11 or singulating planter of FIG. 13.

FIG. 14 is a schematic illustration of a monitoring system 100 for use with the air seeder 10 or the singulating planter 300. The monitoring system 100 includes the controller 110 comprising a central processing unit CPU 116 and includes a graphical user interface (GUI) 112, memory 114 which runs the software programs performing the processes 400, 500, 600 800, 900 and the other processes described above. The monitoring system 100 may also include a communication module 120, and a display device 130. The display device 130, communication module 120, and controller 110 may be mounted in the cab of the tractor. The controller 110 is in electrical communication with the communication module 120 via a harness 150. The communication module 120 may include an authentication chip 122 and memory 126. The communication module 120 is in electrical communication with the display device 130 via a harness 152. The display device 130 may include a GUI 132, memory 134, a CPU 136 and a wireless Internet connection 154 for connecting to a "cloud" based storage server 140. One such wireless Internet connection 154 may comprise a cellular modem 138. Alternatively, the wireless Internet connection 154 may comprise a wireless adapter 139 for establishing an Internet connection via a wireless router.

The display device 130 may be a consumer computing device or other multi-function computing device. The display device 130 may include general purpose software including an Internet browser. The display device 130 also may include a motion sensor 137, such as a gyroscope or accelerometer, and may use a signal generated by the motion sensor 137 to determine a desired modification of the GUI 132. The display device 130 may also include a digital camera 135 whereby pictures taken with the camera 135 may be associated with a global positioning system (GPS) position, stored in the memory 134 and transferred to the cloud storage server 140. The display device 130 may also include a GPS receiver 131.

Figure 15:
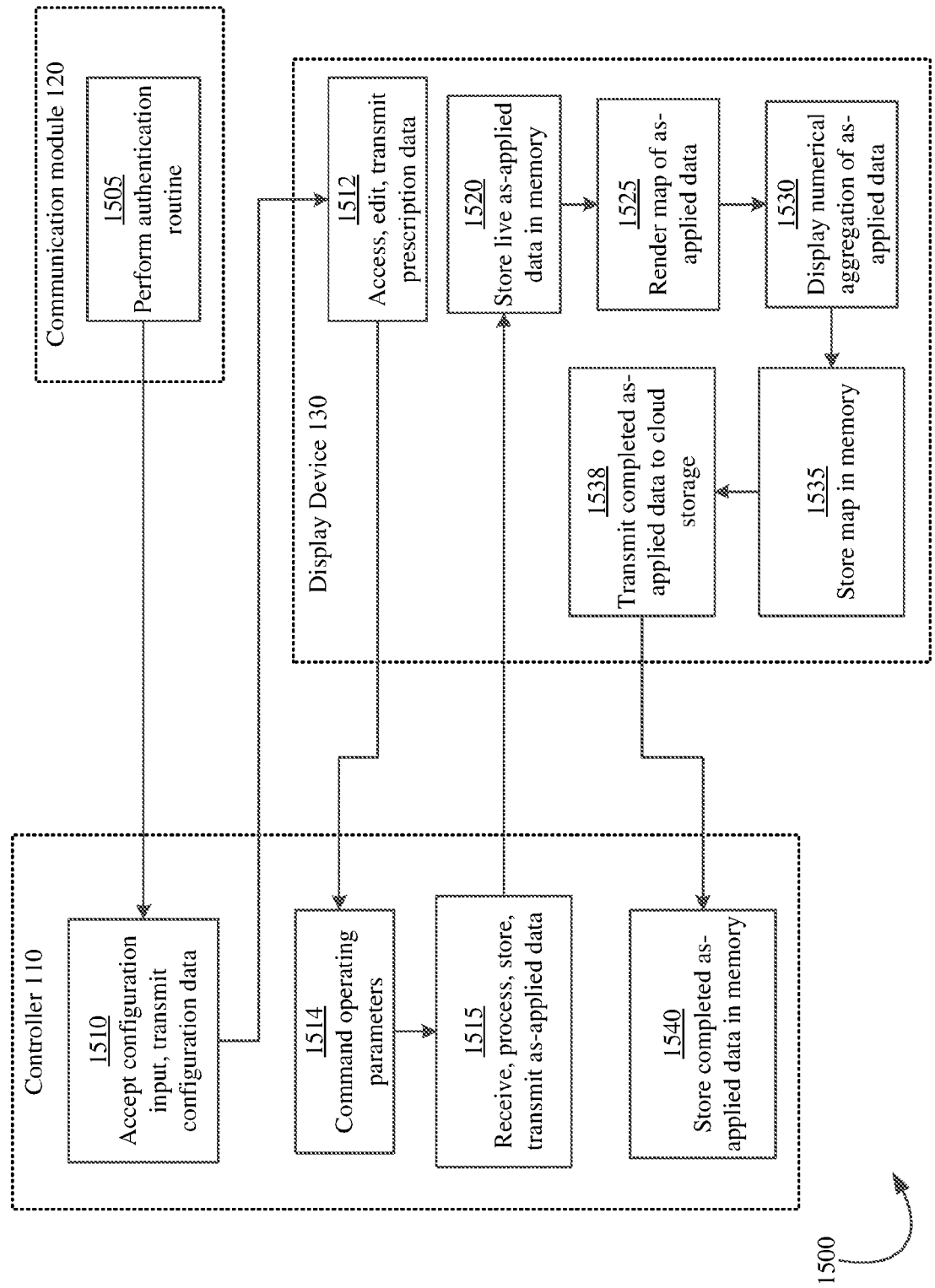
FIG. 15 is an embodiment of a process for setting up the monitoring system, controlling the air seeder or singulating planter and for storing and mapping operational data.

In operation, referring to FIG. 15, the monitoring system 100 may carry out a process designated generally by reference numeral 1500. Referring to FIG. 15 in combination with FIG. 14 at step 1505, the communication module 120 performs an optional authentication routine in which the communication module 120 receives a first set of authentication data 190 from the monitor device 110 and the authentication chip 122 compares the authentication data 190 to a key, token or code stored in the memory 126 of the communication module 120 or which is transmitted from the display device 130. If the authentication data 190 is correct, the communication module 120 preferably transmits a second set of authentication data 191 to the display device 130 such that the display device 130 permits transfer of other data between the monitor device 110 and the display device 130 via the communication module 120.

At step 1510, the monitor device 110 accepts configuration input entered by the user via the GUI 112. In some embodiments, the GUI 112 may be omitted and configuration input may be entered by the user via the GUI 132 of the display device 130. The configuration input may comprise parameters including dimensional offsets between the GPS receiver 166 and the row units 60, 300 of the respective air seeder 10 or singulating planter 300 and the operating parameters of the air seeder 10 or singulating planter 300 (e.g., clutches 170, drives 172 and downforce valves 174). The monitor device 110 then transmits the resulting configuration data 188 to the display device 130 via the communication module 120.

At step 1512, the display device 130 may access prescription data files 186 from the cloud storage server 140. The prescription data files 186 may include a file (e.g., a shape file) containing geographic boundaries (e.g., a field boundary) and relating geographic locations (e.g., GPS coordinates) to operating parameters (e.g., seed planting rates). The display device 130 may allow the user to edit the prescription data file 186 using the GUI 132. The display device 130 may reconfigure the prescription data file 186 for use by the controller 110 and transmits resulting prescription data 185 to the controller 110 via the communication module 120.

At step 1514, as the air seeder 10 or singulating planter 300 traverses the field, the controller 110 sends command signals 198 to the clutches, drives and downforce control. These command signals 198 may include signals for determining whether one or more clutches are engaged, signals determining the rate at which the drives are driven, and signals determining the downforce applied to the row units 60, 310.

At step 1515, as the air seeder 10 or singulating planter 300 traverses the field, the controller 110 receives raw as-applied data 181, including signals from the particle sensor assembly 200, downforce sensors 162, ride quality sensors 164, GPS and speed sensors 168. The controller 110 processes the raw as-applied data 181, and stores the as-applied data to the memory 134. The controller 110 may transmit the processed as-applied data 182 to the display device 130 via the communication module 120. The processed as-applied data 182 may be streaming, piecewise, or partial data. It should be appreciated that according to the method 1500, implement control and data storage are performed by the controller 110 such that if the display device 130 stops functioning, is removed from the monitoring system 100, or is used for other functions, the implement operations and essential data storage are not interrupted.

At step 1520, the display device 130 receives and stores the live processed as-applied data 182 in the memory 134. At step 1525, the display device 130 may render a map of the processed as-applied data 182 (e.g., a population map). At step 1530, the display device 130 may display a numerical aggregation of as-applied data (e.g., population planted by a row unit over the last 5 seconds). At step 1535, the display device 130 may store the location, size and other display characteristics of the application map images rendered at step 1525 in the memory 134. At step 1538, after completing seeding or planting operations, the display device 130 may transmit the processed as-applied data file 183 to the cloud storage server 140. The processed as-applied data file 183 may be a complete file (e.g., a data file). At step 1540 the monitor device 110 may store completed as-applied data (e.g., in a data file) in the memory 114.

The method of mapping and displaying the as applied data 182 may be the same or similar to as applied data maps disclosed in U.S. Pat. No. 9,699,958, incorporated herein in its entirety by reference.

The foregoing description and drawings are intended to be illustrative and not restrictive. Various modifications to the embodiments and to the general principles and features of the system and methods described herein will be apparent to those of skill in the art. Thus, the disclosure should be accorded the widest scope consistent with the appended claims and the full scope of the equivalents to which such claims are entitled.

The invention claimed is:

1. A method of counting particles passing through a passageway, the method comprising:
   (A) generating a first number of light channels at a defined spacing across the passageway transverse to a longitudinal axis of the passageway, the first number of light channels collectively defining a first light plane, each of the first number of light channels generated by a corresponding one of a first number of LED emitters disposed on a first side of the passageway, each of the first number of LED emitters having a known spacing and each producing a light intensity;
   (B) with a first number of photodiodes disposed on a second side of the passageway and with each one of the first number of photodiodes disposed opposite to one of the first number of LED emitters, generating raw output signal values proportional to the light intensity of each of the first number of light channels;
   (C) as the particles pass through the first light plane, recording the raw output signal values generated across each of the first number of light channels in parallel relation over a series of sequential data scans, the raw output signal values being stored in data cells within a first data set;
   (D) normalizing the raw output signal values in each of the data cells of the first data set such that each data cell of the first data set has a Normalized Output Signal (NOS) value;
   (E) analyzing the NOS values of each of the data cells of the first data set to identify data cells joined as a cluster by at least one NOS value within a predefined range of NOS values, each of the identified clusters of joined data cells of the first data set defining a separate first plane Event corresponding to at least one particle passing through the first light plane;
   (F) identifying each said separate first plane Event with a unique first plane identifier;
   (G) summing the NOS values of each said identified first plane Event;
   (H) determining a group speed of each said identified first plane Event;
   (I) determining for each said identified first plane Event, an Event Volume by multiplying the NOS value sum from step (G) by said group speed from step (H) for each said identified first plane Event;
   (J) determining a particle count of each said identified first plane Event by characterizing the Event Volume.

2. The method of claim 1, further comprising:
   (K) generating a second number of light channels at a defined spacing across the passageway transverse to a longitudinal axis of the passageway, the second number of light channels collectively defining a second light plane, each of the second number of light channels generated by a corresponding one of a second number of LED emitters disposed on a third side of the passageway oriented 90 degrees from the first side of the passageway, each of the second number of LED emitters having a known spacing and each producing a light intensity, the second light plane offset from the first light plane along the longitudinal axis of the passageway by a known distance;

(L) with a second number of photodiodes disposed on a fourth side of the passageway and with each one of the second number of photodiodes disposed opposite to one of the second number of LED emitters, generating raw output signal values proportional to the light intensity of each of the second number of light channels;

(M) as the particles pass through the second light plane, recording the raw output signal values generated across each of the second number of light channels in parallel relation over a series of sequential data scans, the raw output signal values being stored in data cells within a second data set;

(N) normalizing the raw output signal values in each of the data cells of the second data set such that each data cell of the second data set has a Normalized Output Signal (NOS) value;

(O) analyzing the NOS values of each of the data cells of the second data set to identify data cells joined as a cluster by at least one NOS value within a predefined range of NOS values, each of the identified clusters of joined data cells of the second data set defining a separate second plane Event corresponding to at least one particle passing through the second light plane;

(P) identifying each said separate second plane Event with a unique second plane identifier;

(Q) summing the NOS values of each said identified second plane Event;

(R) determining a group speed of each said identified second plane Event;

(S) determining for each said identified second plane Event and Event Volume by multiplying each said identified second plane Event's NOS value sum from step (Q) by each said identified second plane Event's group speed from step (R);

(T) determining a particle count of each said identified second plane Event by characterizing the Event Volume of each identified second plane Event;

(U) associating each said identified first plane Event with a corresponding one of said identified second plane Event;

(V) determining which of said associated first plane and second plane identified Events has a greater particle count;

(W) calculating a running particle count over a period of operation by adding the greater particle count from step (V) to a particle count of an immediately preceding one of said associated first plane and second plane identified Events.

3. The method of claim 2, wherein step (N) of normalizing the raw output signal values in each data cell of the second data set includes:
converting the raw output signal values in each data cell of the second data set to an NOS value between 0 and 1, whereby an NOS value of 0 corresponds to the light intensity being at a maximum for a corresponding one of the second number of light channels and which is indicative of that one light channel being unblocked by any of the particles passing through that one light channel, and whereby an NOS value of 1 corresponds to the light intensity at a minimum for a corresponding one of the second number of light channels and which is indicative of that one light channel being entirely blocked by the particles passing through that one light channel.

4. The method of claim 2, wherein the step of determining the group speed of said identified second plane Event includes:
determining a change in time between said identified first plane Event and said identified second plane Event associated with said first plane Event and dividing the change in time by the known distance of the offset of the second light plane from the first light plane.

5. The method of claim 2, wherein the known distance of the offset of the second light plane from the first light plane is between 0.05 to 1 inches (0.13 to 2.5 cm).

6. The method of claim 2, wherein the step of determining a particle count under step (T) characterizing the Event Volume includes:
determining if the Event Volume of the identified second plane Event volume satisfies criteria for a defined particle count.

7. The method of claim 6, wherein the defined particle count is one of: (i) a five particle count, (ii) a four particle count, (iii) a three particle count, (iv) a two particle count and a (v) a one particle count.

8. The method of claim 2, further comprising:
analyzing the NOS values of each of the data cells of the second data set to identify troughs within the joined clusters of NOS data cells defining said separate second plane Event;
subdividing each said separate second plane Event having troughs within the joined clusters of NOS data cells into additional separate second plane Events.

9. The method of claim 2, wherein the passage is a distribution tube on an air seeder and the particles are one of (i) seeds; (ii) fertilizer; or (iii) seeds and fertilizer.

10. The method of claim 2, wherein the passage is a seed tube of a singulating row crop planter and the particles are one of (i) seeds; (ii) fertilizer; or (iii) seeds and fertilizer.

11. The method of claim 1, wherein step (D) of normalizing the raw output signal values in each data cell of the first data set includes:
converting the raw output signal values in each data cell of the first data set to an NOS value between 0 and 1, whereby an NOS value of 0 corresponds to the light intensity being at a maximum for a corresponding one of the first number of light channels and which is indicative of that one light channel being unblocked by any of the particles passing through that one light channel, and whereby an NOS value of 1 corresponds to the light intensity at a minimum for a corresponding one of the first number of light channels and which is indicative of that one light channel being entirely blocked by the particles passing through that one light channel.

12. The method of claim 1, further comprising:
calculating a running particle count over a period of operation by adding the particle count from step (J) to a particle count of an immediately preceding one of said identified first plane Events.

13. The method of claim 1, wherein the step of determining the group speed of said identified first plane Event includes:
determining a width mode of a predetermined number of first plane Events;
determining a time mode of a predetermined number of first plane Events;
dividing the width mode by the time mode;
wherein the width mode is determined by finding a most common Event Width of the first plane Events over a predetermined number of Events, wherein each Event Width of each first plane Event is determined by counting those first number of channels having NOS values defining each first plane Event multiplied by the known spacing of the LED emitters;
wherein the time mode is determined by finding a most common Event Time of the first plane Events over a predetermined number of Events, wherein each Event Time of each first plane Event is determined by finding a time between a first NOS value and a last NOS value defining each first plane Event.

14. The method of claim 1, wherein the step of determining a particle count volume under step (J) by characterizing the Event Volume includes:
determining if the Event Volume of the identified first plane Event satisfies criteria for a defined particle count.

15. The method of claim 14, wherein the defined particle count is one of: (i) a five particle count, (ii) a four particle count, (iii) a three particle count, (iv) a two particle count and a (v) a one particle count.

16. The method of claim 1, further comprising:
analyzing the NOS values of each of the data cells of the first data set to identify troughs within the joined clusters of NOS data cells defining said separate first plane Events;
subdividing each said defined first plane Event having troughs within the joined clusters of NOS data cells into additional separate first plane Events.

17. The method of claim 1, wherein the passage is a distribution tube on an air seeder and the particles are one of (i) seeds; (ii) fertilizer; or (iii) seeds and fertilizer.

18. The method of claim 1, wherein the passage is a seed tube of a singulating row crop planter and the particles are one of (i) seeds; (ii) fertilizer; or (iii) seeds and fertilizer.

19. A particle counter system, comprising:
a first emitter array having a first number of spaced LED emitters, each of the first number of LED emitters producing a light channel having a light intensity, the first emitter array positioned on a first side of a passageway such that the first number of light channels extend across the passageway transverse to a longitudinal axis of the passageway, the first number of light channels defining a first light plane;
a first receiver array having a first number of spaced photodiodes, the first receiver array disposed on a second side of the passageway and with each one of the first number of photodiodes disposed opposite to one of the first number of LED emitters, each of the first number of photodiodes configured to generate raw output signal values proportional to the light intensity of each respective first number of light channels; a controller in signal communication with the first receiver array and having a software program configured to:
(i) receive the raw output signal values from each of the first number of photodiodes over a series of sequential data scans and store the raw output signal values in data cells within a first data set;
(ii) normalize the raw output signal values in each of the data cells of the first data set such that each data cell of the first data set has a Normalized Output Signal (NOS) value;
the particle counter system being characterized in that the controller is further configured to:
(iii) analyze the NOS values of each of the data cells of the first data set to identify data cells joined as a cluster by at least one NOS value within a predefined range of NOS values, each of the identified clusters of joined data cells of the first data set defining a separate first plane Event corresponding to at least one particle passing through the first light plane;
(iv) identify each said separate first plane Event with a unique first plane identifier:
(v) determine for each said identified first plant Event, an Event Volume by multiplying a sum of the NOS values of each said identified first plane Event by a group speed of each said identified first plane Event:
(iv) determine a particle count of each said identified first plane Event by characterizing the Event Volume.

20. The particle counter of claim 19, further comprising:
a second emitter array having a second number of spaced LED emitters, each of the second number of LED emitters producing a light channel having a light intensity, the second emitter array positioned on a third side of a passageway such that the second number of light channels extend across the passageway transverse to a longitudinal axis of the passageway and 90 degrees from the first number of light channels, the second number of light channels defining a second light plane, the second light plane being offset from the first light plane along the longitudinal axis of the passageway by a known distance;
a second receiver array having a second number of spaced photodiodes, the second receiver array disposed on a fourth side of the passageway and with each one of the second number of photodiodes disposed opposite to one of the second number of LED emitters, each of the second number of photodiodes configured to generate raw output signal values proportional to the light intensity of each respective second number of light channels;
wherein each of the second number of photodiodes of the second receiver array is in signal communication with the first receiver array; and
wherein the controller is further configured to:
(i) receive the raw output signal values from each of the second number of photodiodes over a series of sequential data scans and store the raw output signal values in data cells within a second data set;
(ii) normalize the raw output signal values in each of the data cells of the second data set such that each data cell of the second data set has a NOS value;
(iii) analyze the NOS values of each of the data cells of the second data set to identify data cells joined as a cluster by at least one NOS value within a predefined range of NOS values, each of the identified clusters of joined data cells of the second data set defining a separate second plane Event corresponding to at least one particle Passing through the second light plane;
(iv) identifying each said separate second plane Event with a unique second plane identifier;
(v) determine for each said identified second plane Event, an Event Volume by multiplying a sum of the NOS values of each said identified second plane Event by a group speed of each said identified second plane Event;
(vi) determining a particle count of each said identified second plane Event by characterizing the Event Volume of each identified second plane Event;
(vii) associating each said identified first plane Event with a corresponding one of said identified second plane Event;
(viii) determining which of said associated first plane and second plane identified Events has a greater particle count;
(ix) calculating a running particle count over a period of operation by adding the greater particle count from step (viii) to a particle count of an immediately preceding one of said associated first plane and second plane identified Events.

* * * * *